United States Patent [19]
Bosworth et al.

[11] Patent Number: 6,016,488
[45] Date of Patent: Jan. 18, 2000

[54] METHOD AND SYSTEM FOR CONSTRUCTING QUERIES

[75] Inventors: Adam Bosworth, Mercer Island; Ross A. Hunter, Woodinville; David J. Habib, Redmond, all of Wash.

[73] Assignee: Microsoft Corporation, Redmond, Wash.

[21] Appl. No.: 09/186,136

[22] Filed: Nov. 4, 1998

Related U.S. Application Data

[63] Continuation of application No. 08/788,593, Jan. 22, 1997, which is a continuation of application No. 08/116,888, Sep. 2, 1993, Pat. No. 5,619,688.

[51] Int. Cl.[7] ........................................ G06F 17/30
[52] U.S. Cl. .............................................................. 707/4
[58] Field of Search ..................................... 707/4

[56] References Cited

U.S. PATENT DOCUMENTS

| | | | |
|---|---|---|---|
| 4,805,099 | 2/1989 | Huber | 707/102 |
| 5,121,477 | 6/1992 | Koopmans et al. | 345/333 |
| 5,392,390 | 2/1995 | Crozier | 704/505 |
| 5,418,950 | 5/1995 | Li et al. | 707/4 |
| 5,421,008 | 5/1995 | Banning et al. | 707/4 |
| 5,426,781 | 6/1995 | Kaplan et al. | 707/4 |
| 5,454,106 | 9/1995 | Burns et al. | 707/4 |
| 5,455,945 | 10/1995 | VanderDrift | 707/2 |
| 5,463,724 | 10/1995 | Anderson et al. | 707/503 |
| 5,608,898 | 3/1997 | Turpin et al. | 707/201 |
| 5,615,367 | 3/1997 | Bennett et al. | 707/102 |
| 5,619,688 | 4/1997 | Bosworth et al. | 707/4 |
| 5,632,022 | 5/1997 | Warren et al. | 345/350 |
| 5,682,535 | 10/1997 | Knudsen | 395/701 |
| 5,745,712 | 4/1998 | Turpin et al. | 345/333 |

FOREIGN PATENT DOCUMENTS

| | | |
|---|---|---|
| 0 314 279 | 3/1989 | European Pat. Off. . |
| WO 92/16903 | 1/1992 | WIPO . |

OTHER PUBLICATIONS

*Reflex for the Mac*, Borland International, Scotts Valley, CA, 1986, Section Four: Reference, "Reflex Formulas and Queries," pp. 209–222.

*Reflex for the Mac*, Borland International, Scotts Valley, CA, 1986, Section Four: Reference: "Menu References," pp. 223–289.

*Quattro Pro User's Guide*, Borland International, Inc., 1987, 1990, pp. 338–362, 497–498.

Rizzo, T. and K. Strauss, "Darwin: Merrill Lynch Develops a New Workstation Based on Windows 2.03," Microsoft Systems Journal, Jul 1988, pp. 1–12.

Czejdo et al., "Design and Implementation of an Interactive Graphical Query Interface for a Relational Database Management System," in *Proceedings of the IEEE Workshop on Visual Languages*, Oct. 10–12, 1988, pp. 14–20.

Epstein, "A Graphical Query Language for Object–Oriented Data Models," in *Proc. of the 1990 IEEE Workshop on Visual Languages*, Oct. 4–6, 1990, pp. 36–41.

*Omnis, Getting Started for Windows Users*, Blyth Holdings, Inc., 1991, Chap. 4, Ad Hoc Reports and Searches, pp. 4–1, 4–14.

(List continued on next page.)

Primary Examiner—Wayne Amsbury
Attorney, Agent, or Firm—Jones & Askew, LLP

[57] ABSTRACT

These and other objects, which will be apparent as the invention is more fully described, are provided by a method and system for constructing queries which make changes to an entire set of data stored in a database. In a preferred embodiment of the present invention, a user selects one or more tables from which to construct a query. Next, the system stores a list box for each selected table. Each list box is displayed on a user interface including a query window which includes an upper portion and a lower portion. The user selects one or more columns from the list boxes and drags the selected columns into a QBE grid located in the lower portion of the query window. The QBE grid provides a graphical representation of the query requested by the user. When the user invokes the query, the system determines the query type and performs appropriate action on the selected column from the selected tables.

22 Claims, 35 Drawing Sheets

OTHER PUBLICATIONS

States et al., "A Graphical Query Language for Object Oriented Databases," in *Proc. of the 1991 IEEE Workshop on Visual Languages*, Oct. 8–11, 1991, pp. 205–210.

Bowman, K. and K. Abelson, *Quest User's Guide*, Gupta Technologies, Inc., 1991, Chap. 4, "Creating and Opening Tables," pp. 54–68.

Bowman, K. and K. Abelson, *Quest User's Guide*, Gupta Technologies, Inc., 1991, Chap. 5, "Editing Tables," pp. 70–84.

Bowman, K. and K. Abelson, *Quest User's Guide*, Gupta Technologies, Inc., 1991, Chap. 6, "Querying Tables," pp. 92–114.

Boman, K. and K. Abelson, *Quest User's Guide*, Gupta Technologies, Inc., 1991, Chap. 8, "Sorting and Arranging Query Results," pp. 136–149.

Bowman, K. and K. Abelson, *Quest User's Guide*, Technologies, Inc., 1991, Chap. 12, "Report Basics," pp. 174–182.

Bowman, K. and K. Abelson, *Quest User's Guide*, Gupta Technologies, Inc., 1991, Chap. 16, "Creating Tables, Views and Indexes," pp. 266–283.

Bowman, K. and K. Abelson, *Quest User's Guide*, Gupta Technologies, Inc., 1991, Chap. 17, "Modifying Tables, Views and Indexes," pp. 286–303.

|     | Name | Title | Manager | Compensation Type |
|-----|------|-------|---------|-------------------|
| 101 — | Andrea | Tester | Rose | salary |
| 102 — | Ben | Tester | Rose | salary |
| 103 — | Bruce | Assembler | Melba | wage |
| 104 — | Ceilia | Ad Buyer | Penny | salary |
| 105 — | Cindy | Draftsperson | Manelio | salary |
| 106 — | Eunice | Tester | Rose | salary |
| 107 — | Gene | Planner | Manelio | salary |
| 108 — | Harvey | Ad Buyer | Penny | salary |
| 109 — | Isaac | Assembler | Sid | wage |
| 110 — | Jeremy | Metalworker | Gus | salary |
| 111 — | Jill | Assembler | Melba | salary |
| 112 — | Joe | Metalworker | Gus | salary |
| 113 — | Judith-Ann | Detail Designer | Rich | salary |
| 114 — | Louise | Ad Writer | Phillip | salary |
| 115 — | Maria | High-Level Designer | Rich | salary |
| 116 — | Marsha | Assembler | Melba | wage |
| 117 — | Melvin | Ad Writer | Phillip | salary |
| 118 — | Merrill | Assembler | Melba | wage |
| 119 — | Rolf | High-Level Designer | Rich | salary |
| 120 — | Sandra | Sr. Tester | Julia | salary |
| 121 — | Selma | High-Level Designer | Manelio | salary |
| 122 — | Stan | Ad Writer | Phillip | salary |
| 123 — | Sung | Detail Designer | Rich | salary |
| 124 — | Ted | Ad Buyer | Penny | salary |
| 125 — | Terry | Assembler | Sid | wage |
| 126 — | William | Assembler | Gus | wage |
| 127 — | Zoe | Metalworker | Sid | salary |

*FIG. 1A*

METHOD AND SYSTEM FOR CONSTRUCTING QUERIES

CROSS-REFERENCE TO RELATED APPLICATION

This application is a continuation of pending U.S. patent application Ser. No. 08/788,593, filed Jan. 22, 1997, which is a continuation of U.S. application Ser. No. 08/116,888, filed Sep. 2, 1993, issued as U.S. Pat. No. 5,619,688.

TECHNICAL FIELD

This invention relates generally to a user interface for constructing queries and, more specifically, to a system and method for constructing queries which make changes to data sorted in a database.

BACKGROUND OF THE INVENTION

A database is a collection of related data. A database management system (DBMS) is a collection of programs that enables users to construct and maintain a database. The DBMS is hence a general-purpose software system that facilitates the processes of defining and constructing databases. Defining a database involves constructing the type of data to be stored in the database, along with a detailed description of each type of data. Constructing the database involves storing the data itself on a storage medium controlled by the DBMS.

Data in a DBMS is typically stored in tables. A table is a series of rows, also called records. Each row contains data about a particular thing, such as an employee. The rows are divided into columns. The intersection of a row and a column is referred to as a field. Each column specifies a particular type of data that is contained in each field of the column. Each field contains the data of the particular type for the intersecting row and column. Example columns for an Employees table include Name, Title, Manager, and CompensationType. A row of such a table would contain the name, title, manager, and compensation type for a particular employee, each in a separate field.

FIG. 1A is a table diagram showing the contents of a sample table named Employees. The Employees table 100 contains 27 rows 101–127. Each row contains a field for each for four columns, a Name column 131, a Title column 132, a Manager column 133, and a Compensation Type 134. For instance, row 101 has a Name field that contains "Andrea", a Title field that contains "Tester", a Manager field that contains "Rose", and a Compensation Type field that contains "Salary."

A database engine is a computer program which includes the capability for retrieving data from the tables of the DBMS. The database engine can either be used directly by a person or used by a database front-end program acting on a person's behalf. An engine typically receives instructions to retrieve data stored in tables, called queries, from a user. Queries are usually expressed in one of the several common query languages, such as structured query language (SQL).

A query specifies the data to be retrieved and the manipulations to be made to the retrieved data. A query, therefore, specifies the table or tables from which data is to be retrieved (the source tables), selection criteria for the rows to be retrieved, the definition of derived fields, and other related information. A derived field is a field that contains data that is derived from one or more other fields.

In response to a query, a conventional (typical prior) engine performs data retrieval and manipulation specified by the query. In doing so, the conventional engine generates a conventional query table to hold the result. The contents of the conventional query table may be examined by using primitive operations defined by the conventional engine. These primitive operations may be used to browse through the query table, that is, step through the rows of the conventional query table and retrieve data that the engine stored in the fields which processing the query. In this way, the user can collect the data comprising the result of the query.

As an example of a query, the user could construct and submit a query to select the salaried employees from the employees table, then use a Managers table to determine each employee's DepartmentNumber based on the name of the employee's manager. FIG. 1B is a table diagram showing the contents of the Managers table. The Managers table 150 contains nine rows 151–159. Each row contains a field for each of two columns: a Manager column 161 and a DepartmentNumber column 162. If expressed in SQL, the query would appear as follows:

1. SELECT Employees.Name, Employees.Manager,
2. Managers.DepartmentNumber
3. FROM Employees, Managers, Employees INNER JOIN Managers
4. ON Employees.Manager=Managers.Manager
5. WHERE Employees.Compensation Type="salary";

TABLE 1

Line 5 of the query tells the engine to select the rows of the Employees table whose CompensationType fields contain "salary". Line 3 tells the engine to join the selected rows of the Employees table with the Managers table. Line 4 tells the engine that a row of the Employees table should be joined to a row of the Managers table if the Manager field of the Employees table equals the Manager field of the Managers table. Lines 1–2 tell the engine that the query table should contain the following columns of the joined rows: Name, Manager, and DepartmentNumber.

FIG. 2 is a table diagram showing the contents of the conventional query table constructed by the conventional engine in response to the query shown in Table 1. Query Table 200 has 22 rows of the Employees table corresponding to employees with a CompartmentType of "salary." Rows corresponding to rows 103, 109, 116, 118, 125 and 126 of the Employees table do not appear because they do not have "salary" in the Compensation Type column. The query table has three columns: a Name column 231, a Manager column 232, and a DepartmentNumber column 233. The data in the Name and Manager columns has been copied from the Employees table. For example, row 201 contains a copy of the contents of fields in row 101. Specifically, it contains an employee field containing "Andrea" and a Manager field containing "Rows." Similarly, the data in the DepartmentNumber column has been copied from the Manager table. For example, row 201 contains a copy of the contents of fields in row 151. Specifically, it contains a DepartmentNumber field containing "3."

It is desirable to make the process of constructing queries simple and efficient.

SUMMARY OF THE INVENTION

It is an object of the present invention to provide a method and system for constructing queries.

It is another object of the present invention to provide a method and system which facilitates constructing queries in a simple and efficient manner.

These and other objects, which will be apparent as the invention is more fully described, are provided by a method and system for constructing queries which make changes to an entire set of data stored in a database. In a preferred embodiment of the present invention, a user selects one or more tables from which to construct a query. Next, the system stores a list box for each selected table. Each list box is displayed on a user interface including a query window comprising an upper portion and a lower portion. The user selects one or more columns from the list boxes and drags the selected columns into a QBE grid located in the lower portion of the query window. The QBE grid provides a graphical representation of the query requested by the user. When the user invokes the query, the system determines the query type and performs appropriate action on the selected columns from the selected tables.

BRIEF DESCRIPTION OF THE DRAWINGS

FIG. 1A is a table diagram showing the contents of a sample base table named Employees.

FIGS. 40–32 are screen shots illustrating a self-join query.

Figure 1B:
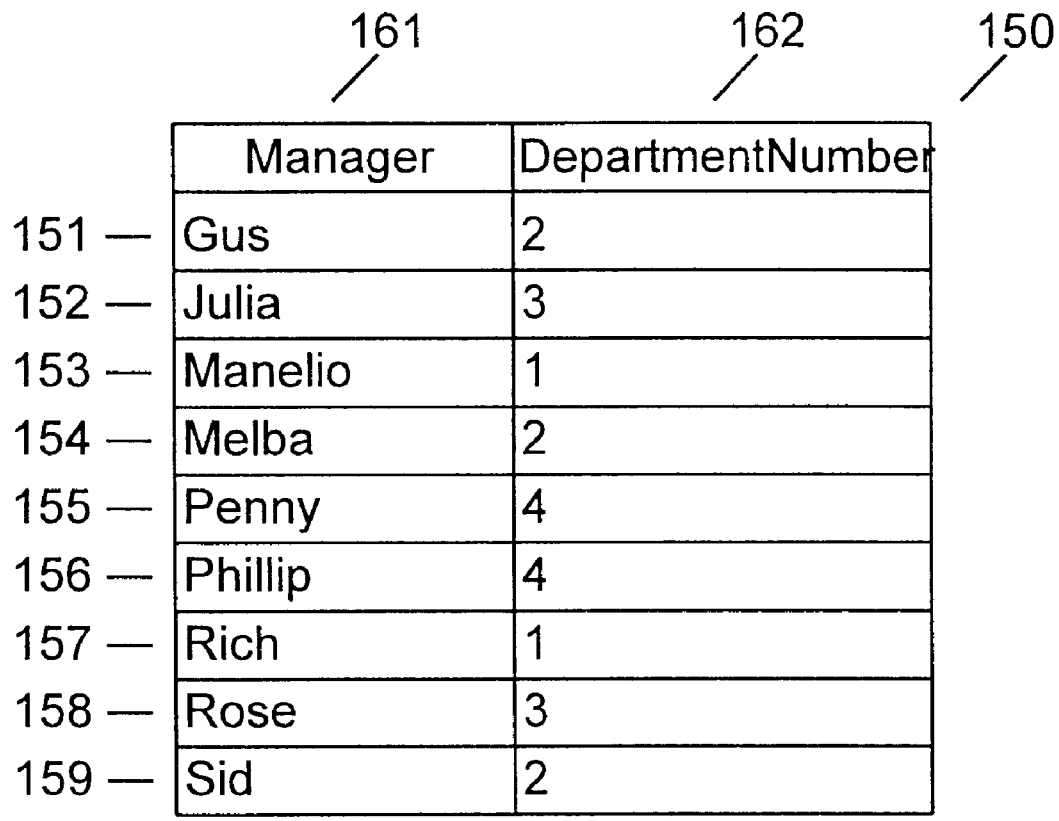
FIG. 1B is a table diagram showing the contents of the manager's table.
Figure 2:
FIG. 2 is a table diagram showing the contents of the conventional query table created by the conventional engine in response to the query shown in Table 1.
Figure 3A:
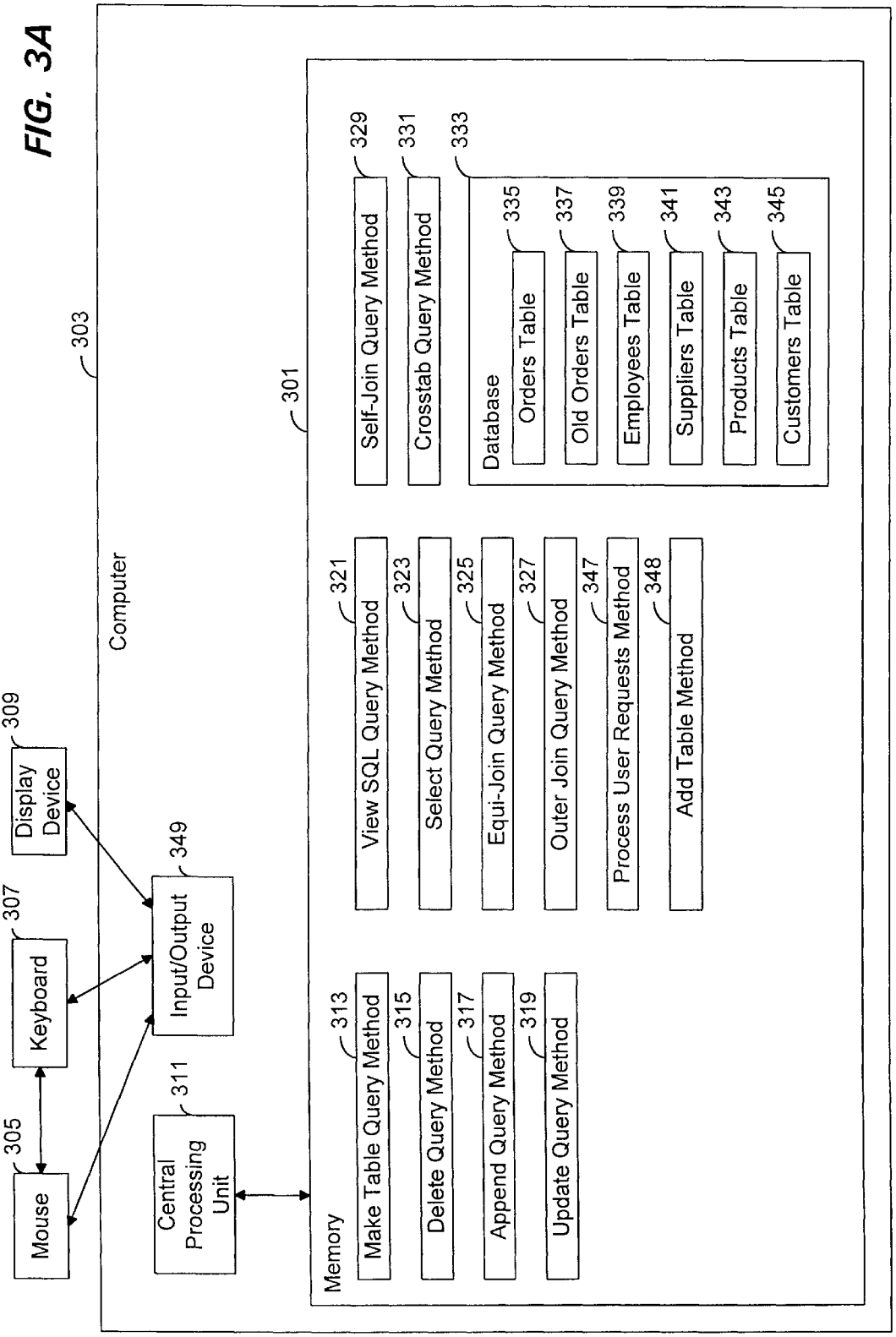
FIG. 3A is a block diagram showing a system embodying the present invention for constructing queries.
Figure 3B:
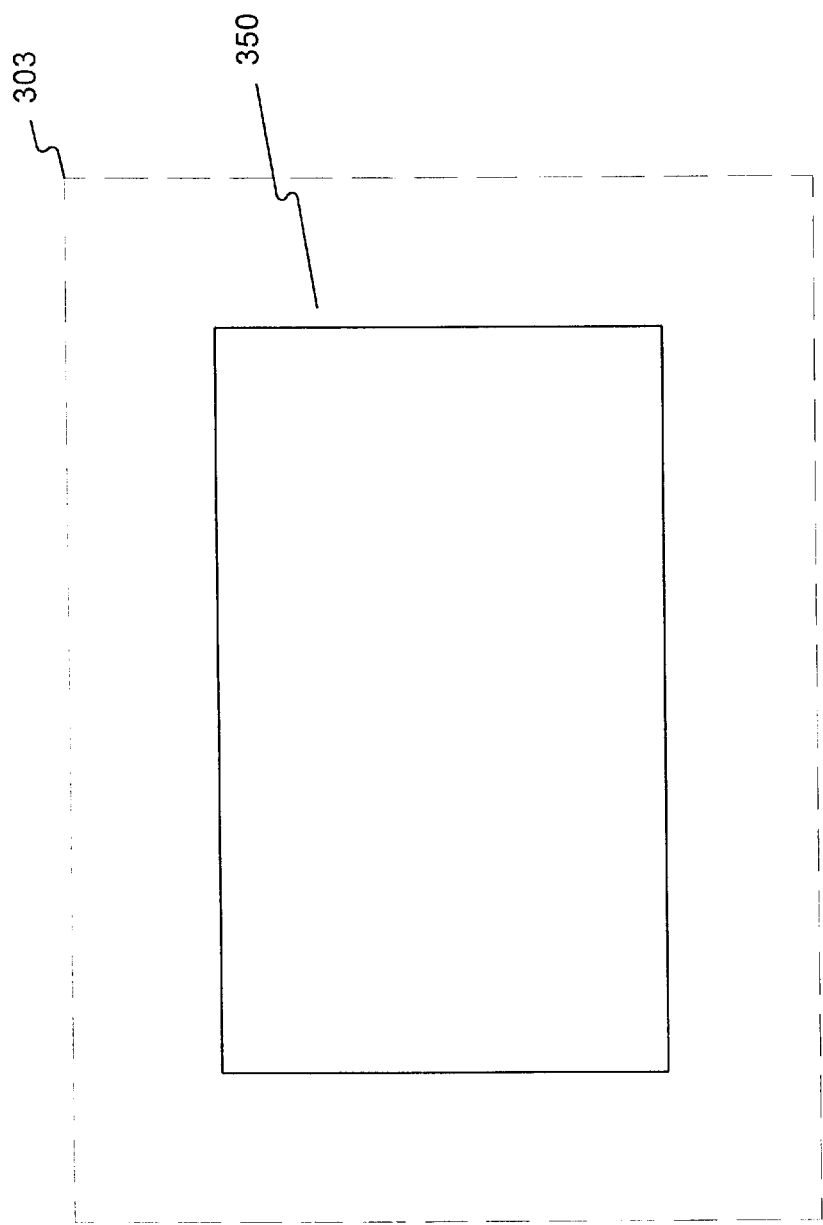
FIG. 3B is a block diagram of the computer 303, upon which screen shots 350 reside.

Appendix A is a user's guide for the system of FIG. 3.

DETAILED DESCRIPTION OF THE INVENTION

The present invention provides a method and system for constructing queries that make changes to a set of records in a similar way. The present invention provides this ability by invoking method stored in a memory 301 (FIG. 3A) of a computer 303. The methods are typically invoked through the use of a mouse 305 or a keyboard 307 on a user interface of a display device 309. When invoked, the preferred methods of the present invention are executed on a central processing unit (CPU) 311. As FIG. 3A illustrates, the preferred method of the present invention includes a method 313 for a make table query, a method 315 for a delete query, a method 317 for an append query, a method 319 for an update query, a method 321 for a view SQL query, a method 323 for a select query, a method 325 for an equi-join query, a method 327 for an outer join query, a method 329 for a self-join query, and a method 331 for a crosstab query.

The preferred method of the present invention makes changes to an entire set of records stored in a database 333 of the memory 301. The database 333 is organized into tables including an orders table 335, an old orders table 337, an employees table 339, a suppliers table 341, a products table 343 and a customers table 345.

This application is related to a co-pending application entitled "METHOD AND SYSTEM FOR SUPPORTING SCROLLABLE, UPDATEABLE DATABASE QUERIES," filed Sep. 2, 1993, commonly assigned with the present invention, and incorporated herein by reference.

Figure 4A:
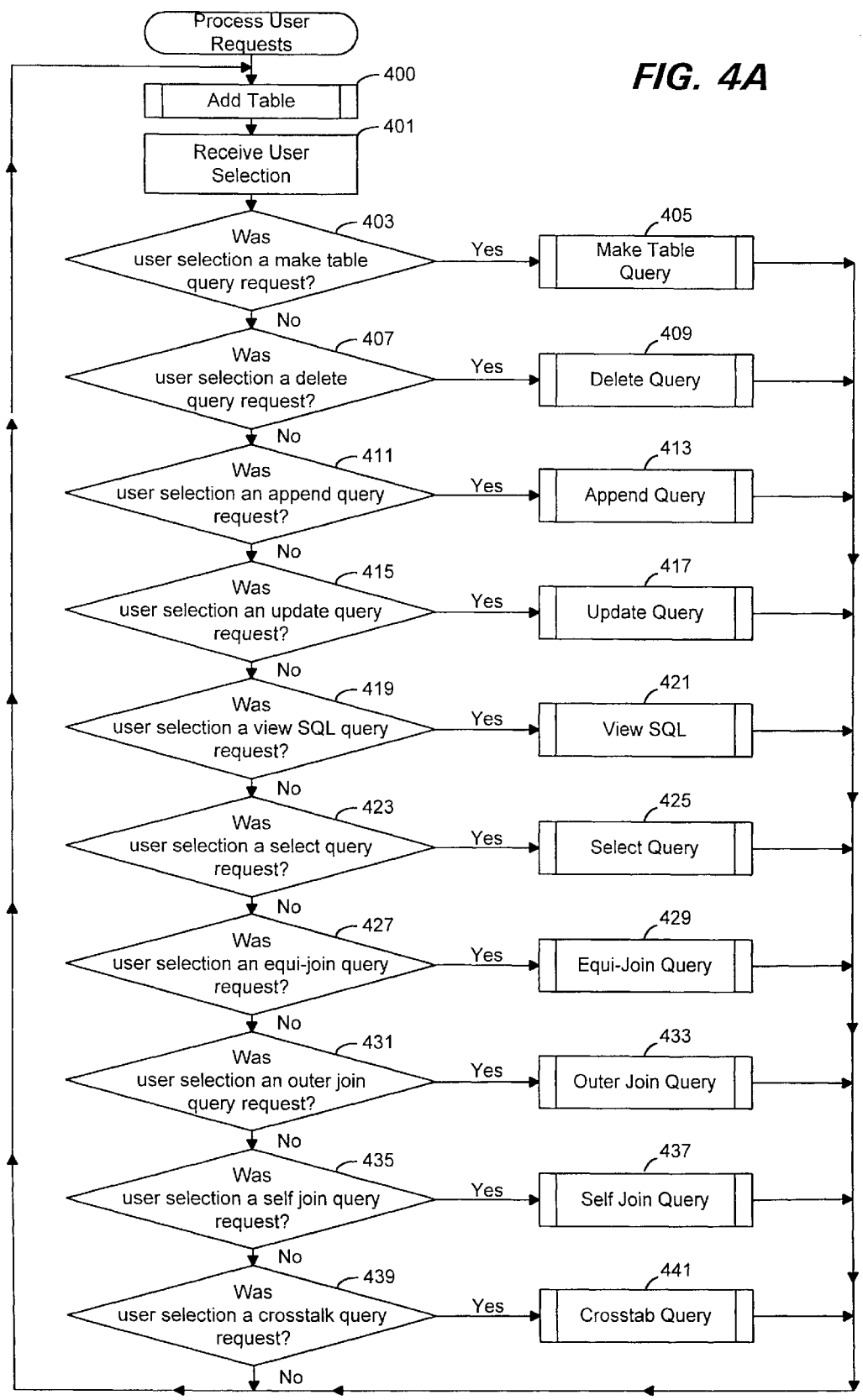
FIG. 4A is a flow diagram of a method to process user requests for the system of FIG. 3A.

FIG. 4A is a flow diagram of the method 347 (FIG. 3A) to process user requests. The method 347, when executing on the central processing unit 311, receives user requests to construct queries and invokes the appropriate method stored in the memory 301 to process the request. After the user request has been processed, the method 347 continues to retrieve and process each construct query request entered on the computer 303. In this way, the present invention provides an ability to easily and efficiently construct queries that make changes to an entire set of records.

Figure 4B:
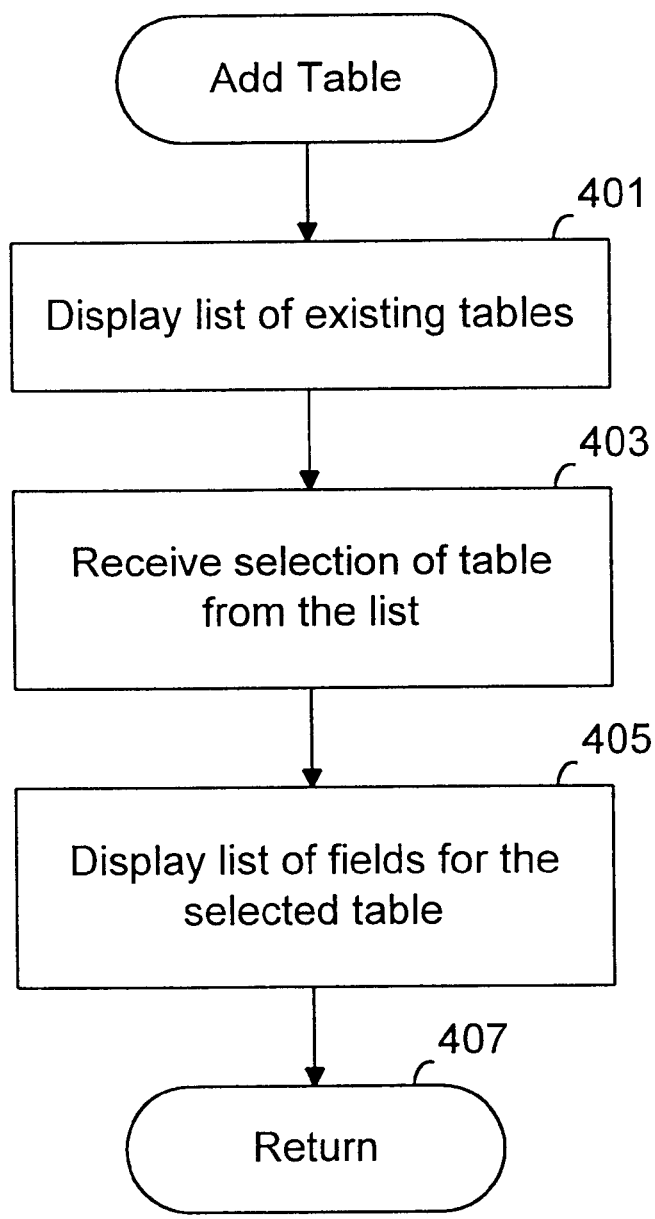
FIG. 4B is a flow diagram of the method to add a table for the system of FIG. 3A.
Figure 5:
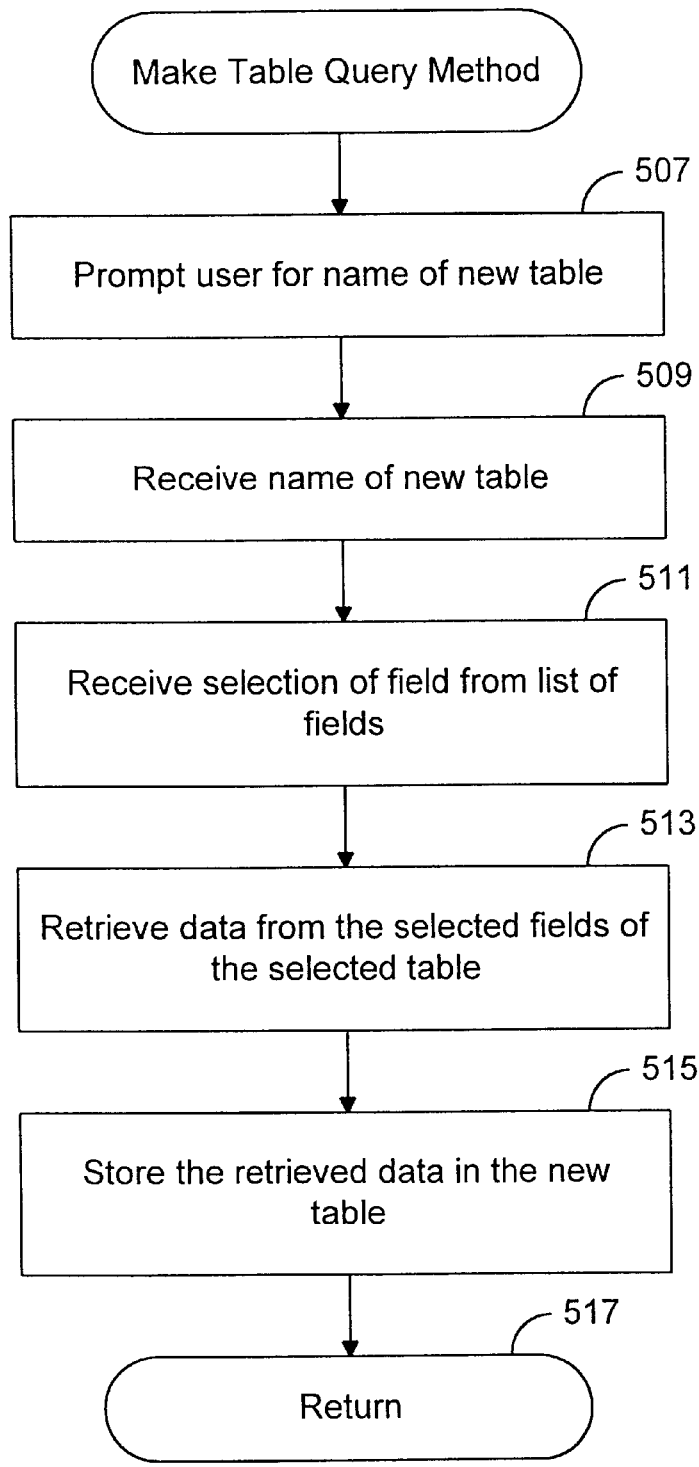
FIG. 5 is a flow diagram of a method to make a table query for the system of FIG. 3A.

In step 400, the method process user requests invokes the method add a table. The method add a table displays a table from the database 333 on the display device 309. The method add a table typically displays the table in the form of a list box containing the column names of the table. By displaying the table, the user of the computer 303 can manipulate the columns of tables to construct queries. The method add a table is discussed in more detail below and is shown in FIG. 4B. In step 401, the method process user requests receives a user selection via the input/output device 349. In step 403, the method 347 determines whether the user selection was a make table query request. If the user selection was a make table query request, then in step 405 the method process user requests invokes the method 313 make table query. The method make table query constructs a table by retrieving records specified in a query request, and using the retrieved records to construct a new table. The method make table query is discussed in more detail below and is shown in FIG. 5. Upon completion of step 405 processing continues with step 400.

Figure 6:
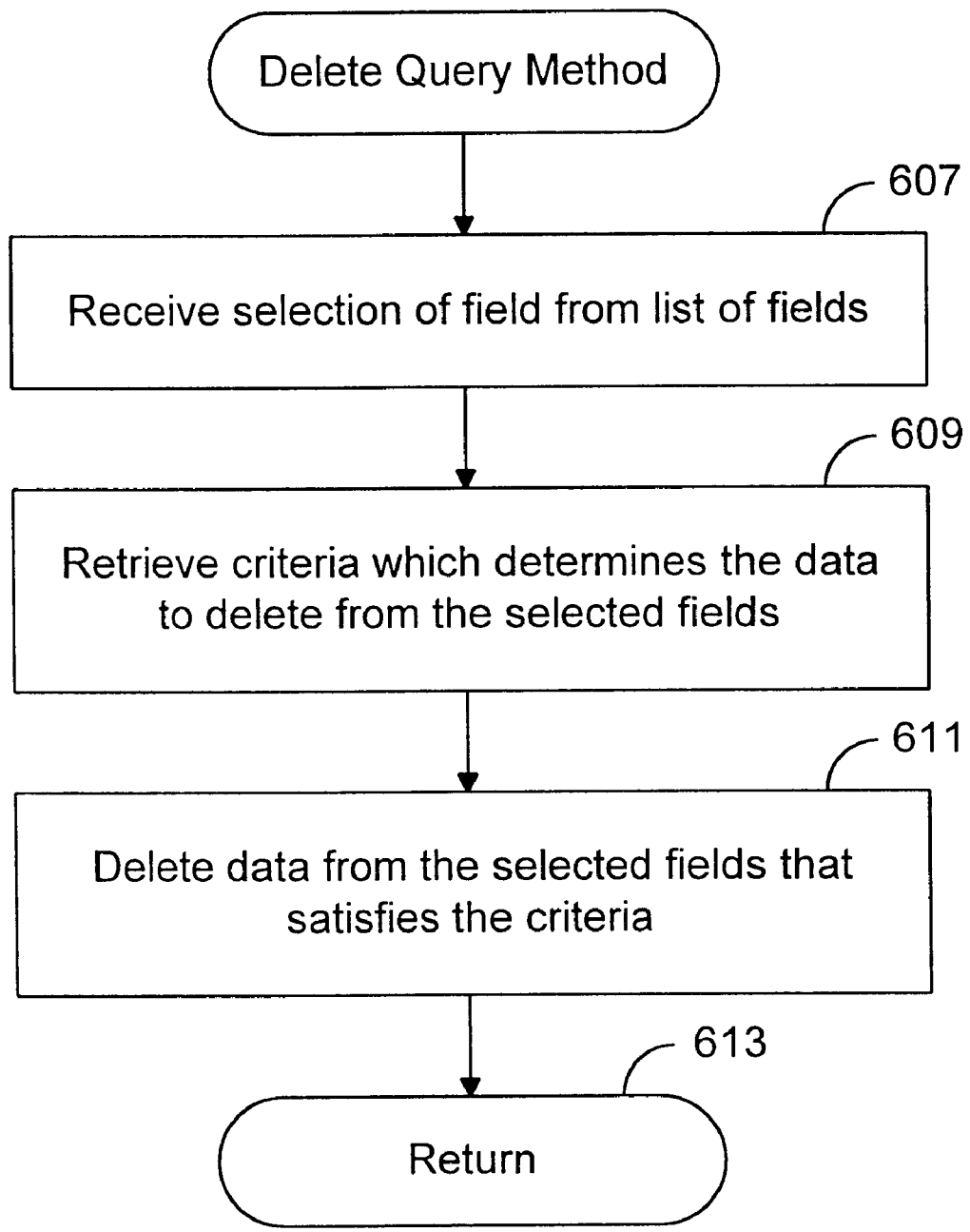
FIG. 6 is a flow diagram of a method for a delete query for the system of FIG. 3A.

Returning to the discussion of step 403, if the user selection was not a make table query request, then in step 407 the method process user requests determines whether the user selection was a delete query request. If user selection was a delete query request, then in step 409 the method process user requests invokes the method delete query. The method delete query removes a number of records from a table that meet specified conditions. The method 315 for a delete query is discussed in more detail below and is shown in FIG. 6. Upon completion of step 409, processing continues with 400.

Figure 7:
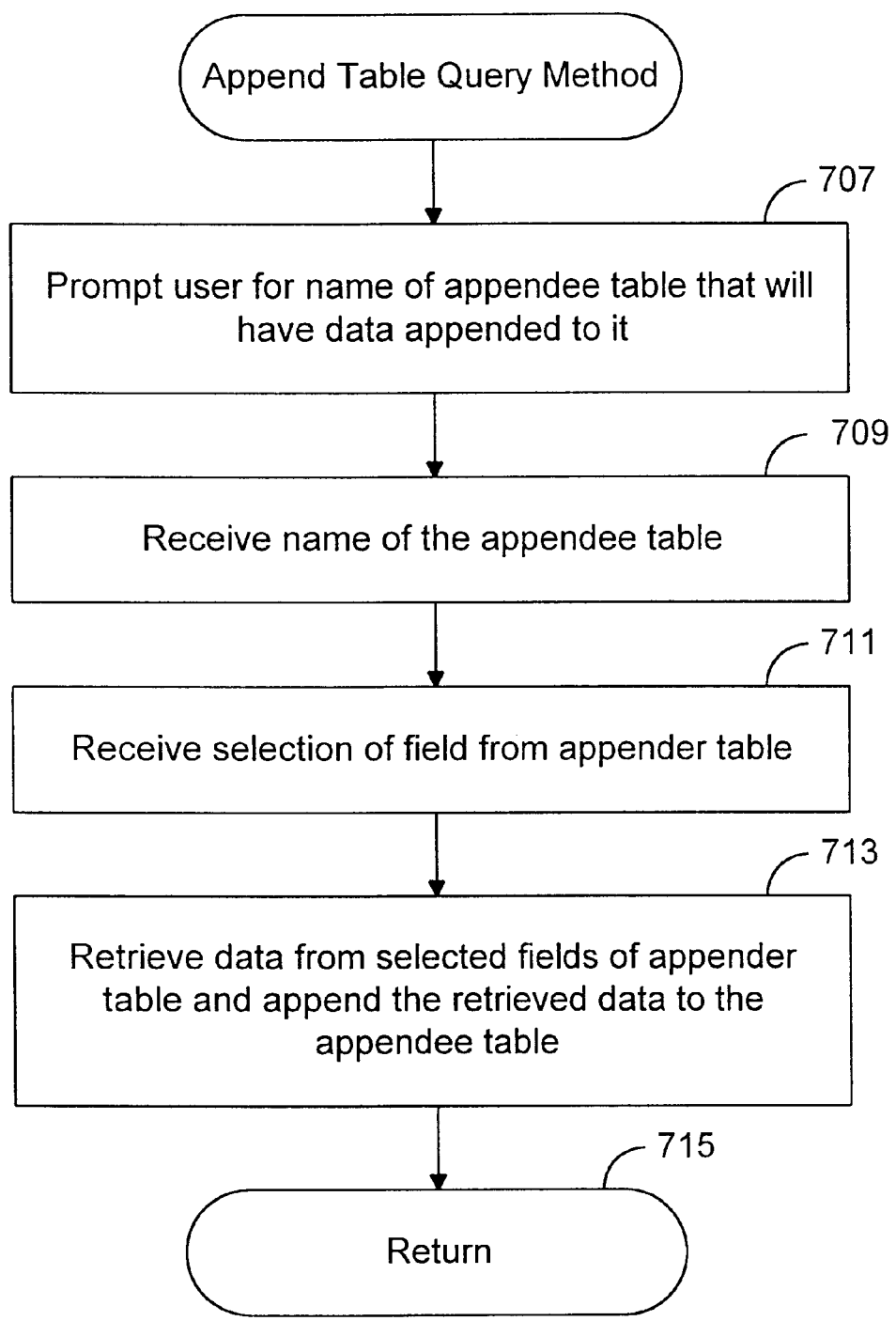
FIG. 7 is a flow diagram of a method for an append table query for the system of FIG. 3A.

Returning to the discussion of step 407, if the user selection was not a delete query request, then in step 411 the method process user requests determines whether the user selection was an append query request. If the user selection was an append query request, then in step 413 the method process user requests invokes the method append query. The method append query adds (appends) records to an existing table. The method append query is discussed in more detail below and is shown in FIG. 7. Upon completion of step 413, processing continues with step 400.

Figure 8:
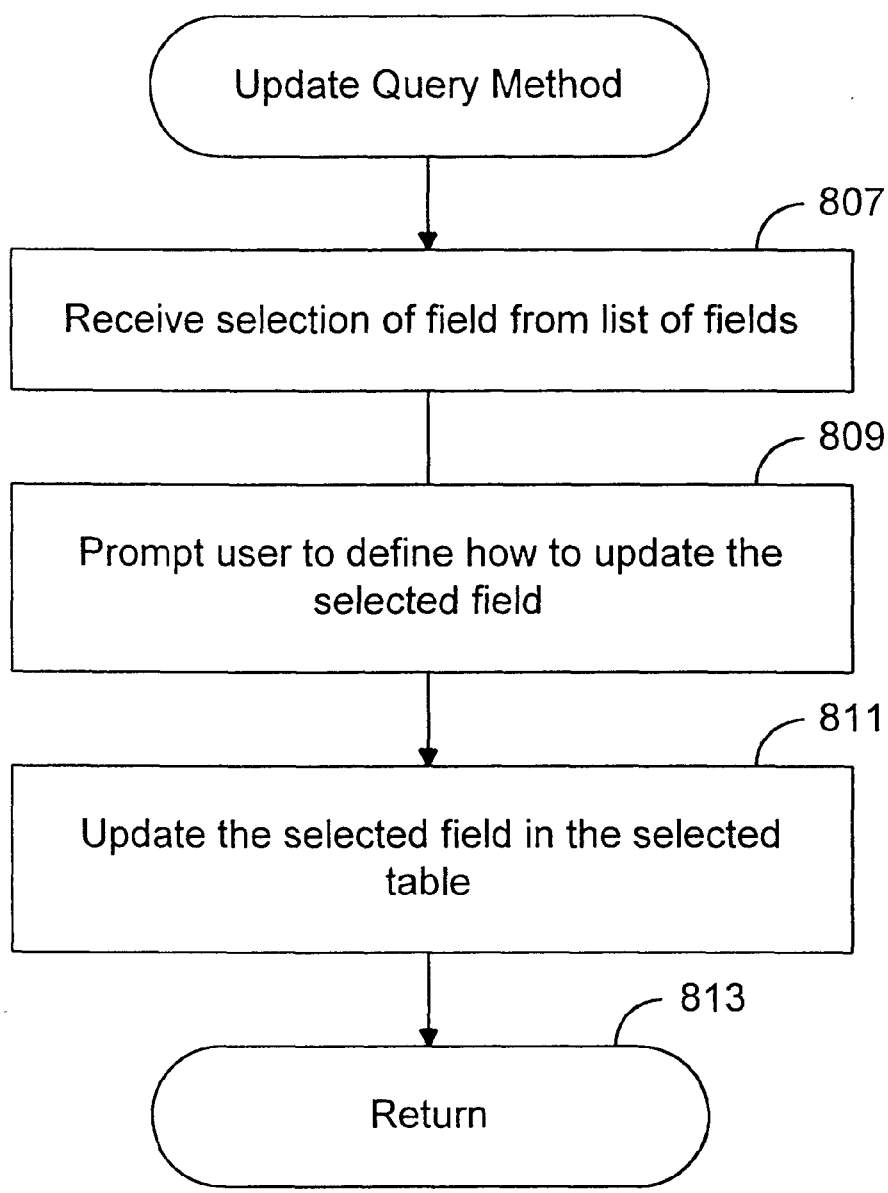
FIG. 8 is a flow diagram of a method for an update query for the system of FIG. 3A.

Returning to the discussion of step 411, if the user selection was not an append query request, then in step 415 the method process user requests determines whether the user selection was an update query request. If the user selection was an update query request, then in step 417 the method process user requests invokes the method update query. The method update query changes data in existing tables based on specified criteria. The method update query is discussed in more detail below and is shown in FIG. 8. Upon completion of step 417 processing continues with step 400.

Figure 14:
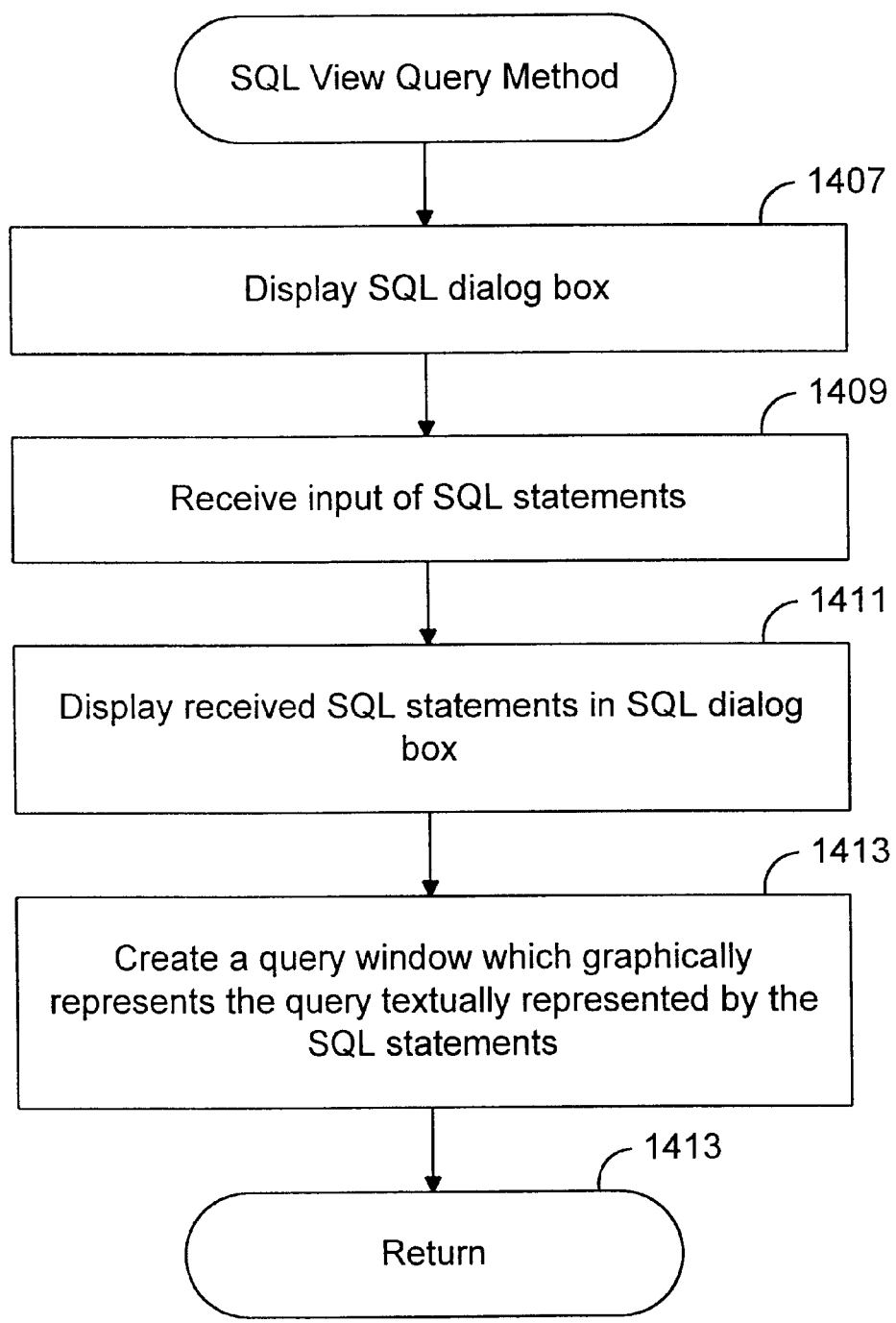
FIG. 14 is a flow diagram of the method SQL view query for the system of FIG. 3A.

Returning to the discussion of step 415, if the user selection was not an update query request, then in step 419 the method process user requests determines whether the user selection was a view SQL query request. If the user selection was a view SQL query request, then in step 421 the method process user requests invokes the method view SQL query. The method view SQL query allows a user to change an SQL statement and then reflects those changes in a QBE grid (discussed in more detail below) which visually represents a query. The method view SQL query is discussed in more detail below and is shown in FIG. 14. Upon completion of step 421 processing continues with step 400.

Figure 9:
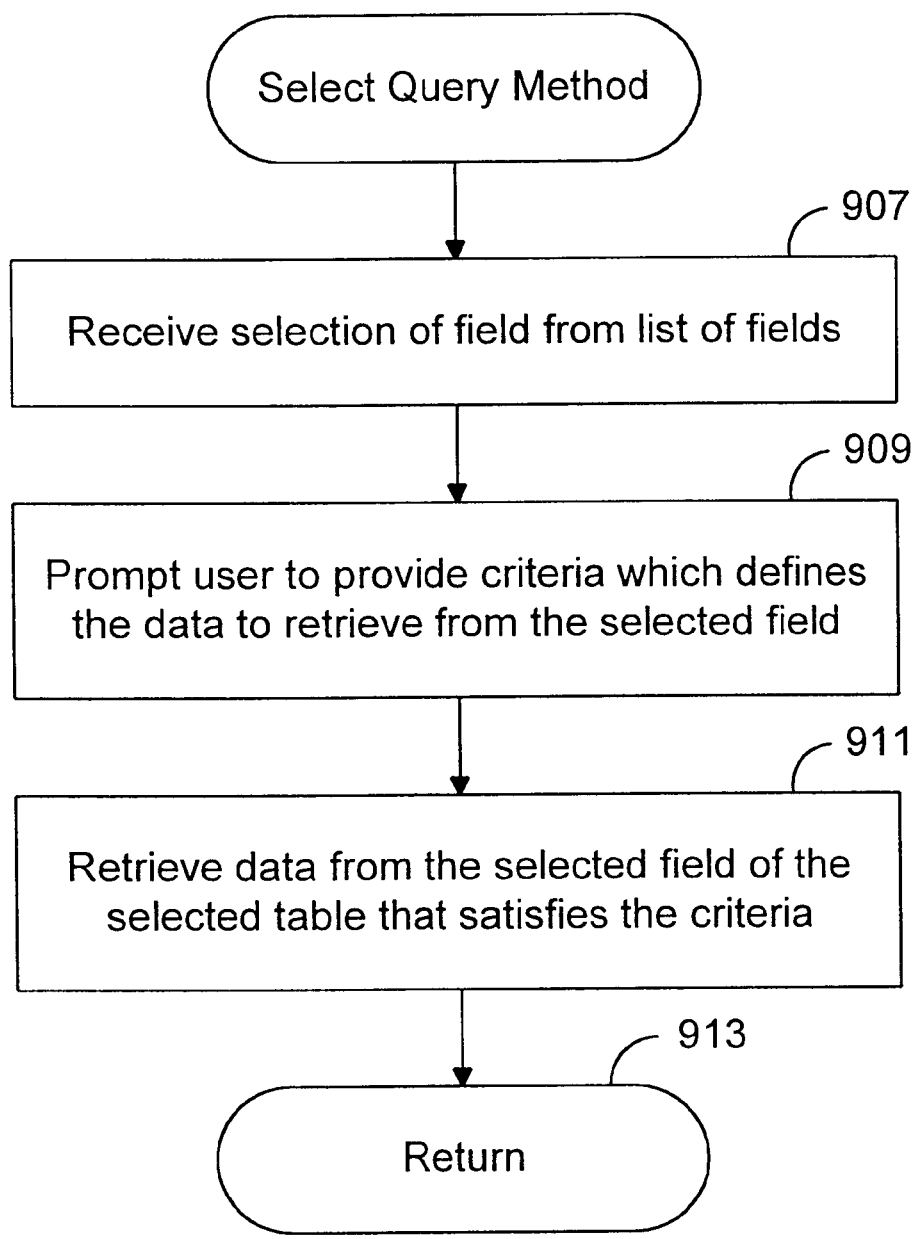
FIG. 9 is a flow diagram of a method for a select query for the system of FIG. 3A.

Returning to the discussion of step 419, if the user selection was not a view SQL query request, then in step 423 the method process user requests determines whether the user selection was a select query request. If the user selection was a select query request, then in step 425 the method process user requests invokes the method select query. The method select query retrieves data from specified tables which meets criteria specified in the select query request. The method select query is discussed in more detail below and is shown in FIG. 9. Upon completion of step 425, processing continues with step 400.

Figure 11:
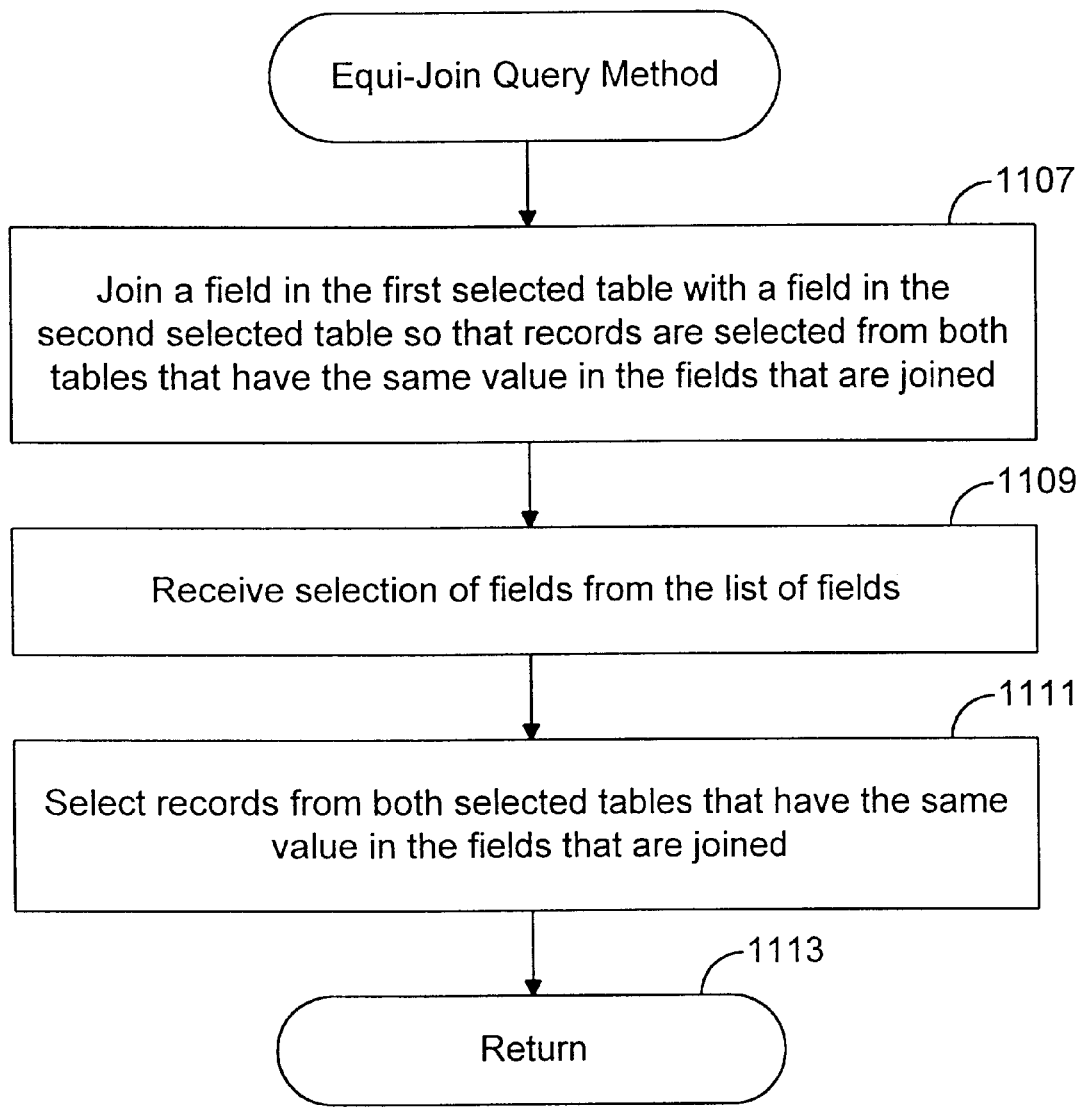
FIG. 11 is a flow diagram of the method equi-join query for the system of FIG. 3A.

Returning to the discussion of step 423, if the user selection was not a select query request, then in step 427 the method process user requests determines whether the user selection was an equi-join query request. If the user selection was an equi-join query request, then in step 429 the method process user requests invokes the method equi-join query. The method equi-join query selects records from a given set of tables that have the same value in a selected set of fields. The method equi-join query is discussed in more detail below and is shown in FIG. 11. Upon completion of step 429, processing continues with step 400.

Figure 12:
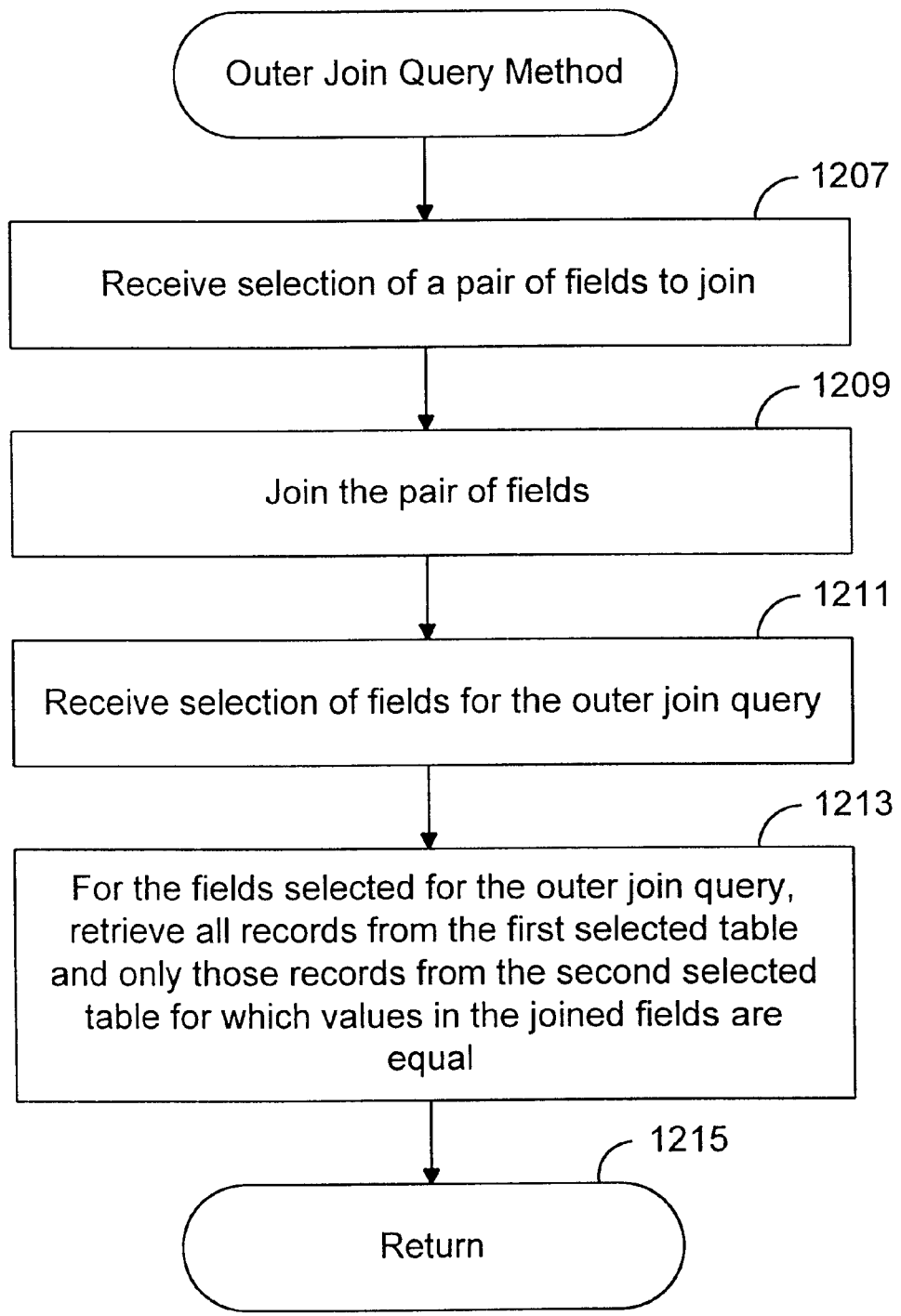
FIG. 12 is a flow diagram of the method outer-join query for the system of FIG. 3A.

Returning to the discussion of step 427, if user selection was not an equi-join query request, then in step 431 the method process user requests determines whether the user selection was an outer-join query request. If the suer selection was an outer-join query request, then in step 433 the method process user requests invokes the method outer-join query. The method outer-join query includes all records from one table and only those records from the other table for which values in a preselected set of fields are equal. The method outer-join query is discussed in more detail below and is shown in FIG. 12. Upon completion of step 433, processing continues with step 400.

Figure 13:
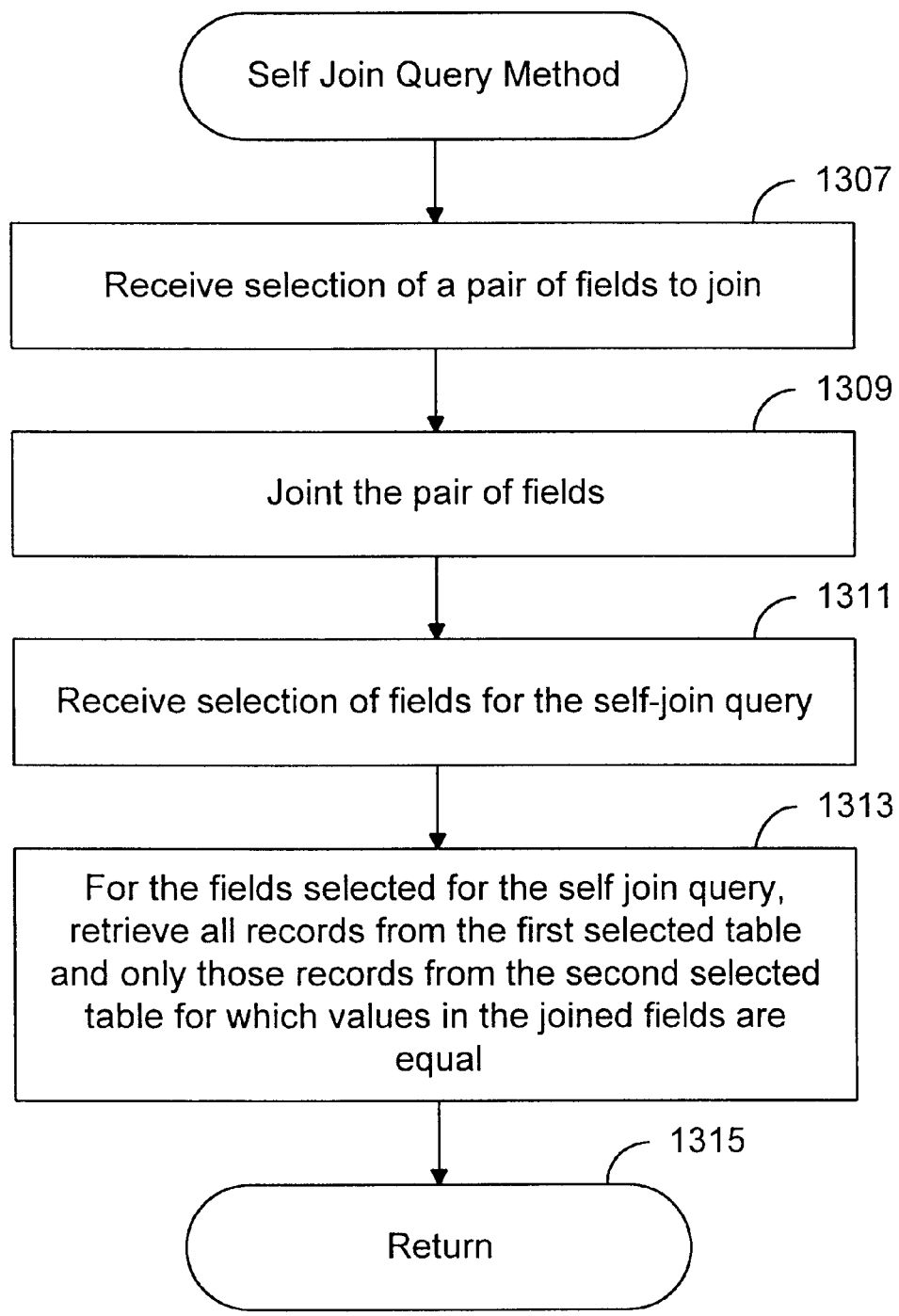
FIG. 13 is a flow diagram of the method self-join query for the system of FIG. 3A.

Returning to the discussion of step 431, if the user selection was not an outer-join query request, then in step 435 the method process user requests determines whether the user selection was a self-join query request. If these the user selection was a self-join query request, then in step 437 the method process user requests invokes the method self-join database. In step 437, the method process user requests invokes the method self-join query. The method self-join query allows the user to relate values within a single table. The method self-join query is discussed in more detail below and is shown in FIG. 13. Upon completion of step 437 processing continues with step 400.

Figure 10:
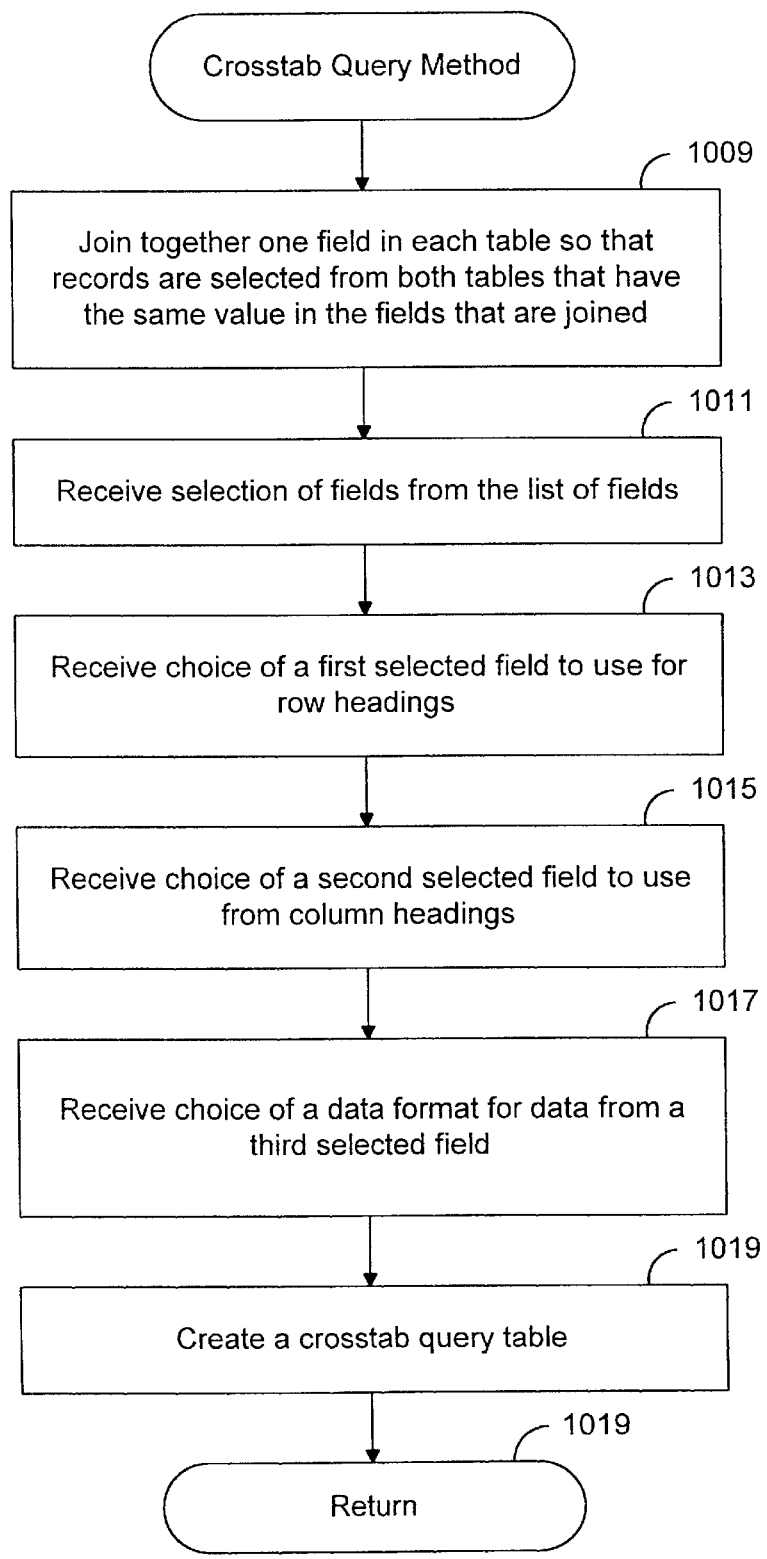
FIG. 10 is a flow diagram of the method crosstab query for the system of FIG. 3A.

Returning to the discussion of step 435, if the user selection was not a self-join request, then in step 439 the method process user requests determines whether the user selection was a crosstab query request. If the user selection was a crosstab query request, then in step 441 the method process user requests invokes the method crosstab query. The method crosstab query retrieves data from tables and presents the retrieved data in a spreadsheet-like format. The method 331 for a crosstab query is discussed in more detail below and is shown in FIG. 10. Upon completion of step 441, processing continues with step 401. Returning to the discussion of step 439, if the user selection was not a crosstab query request, the processing continues with step 400.

Figure 15:
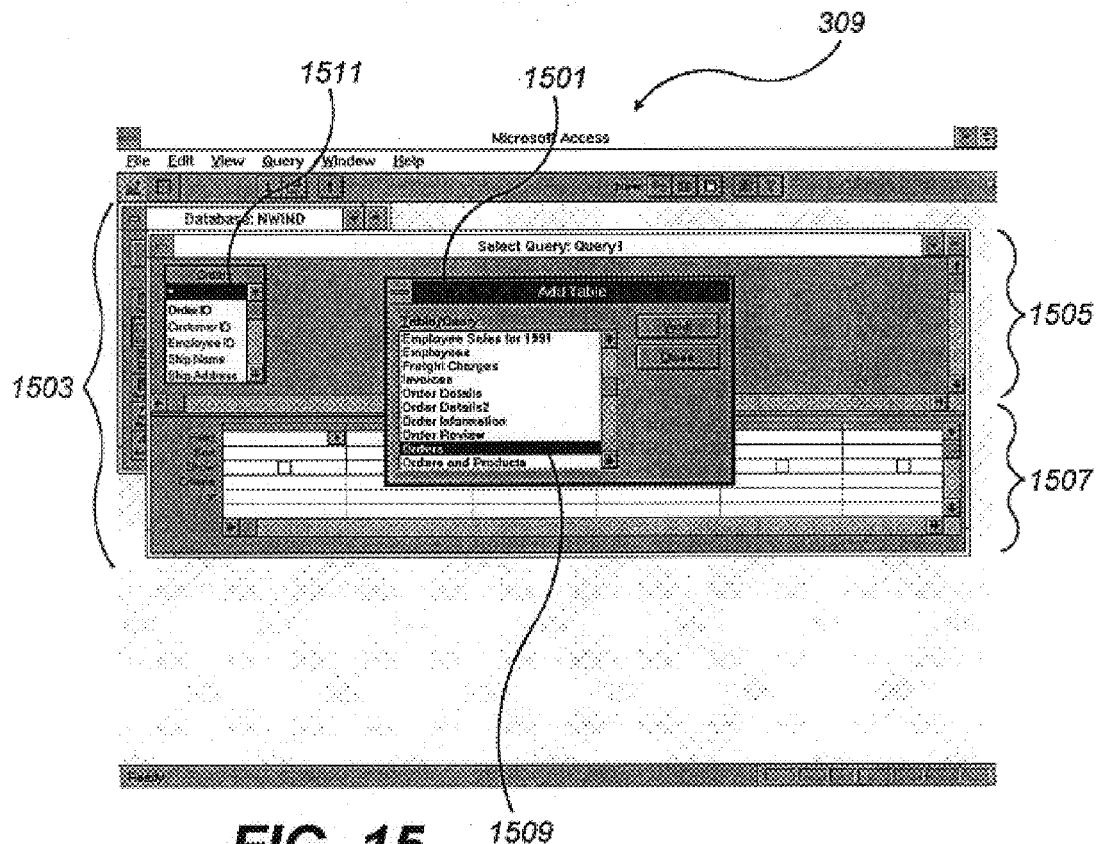
FIGS. 15–18 are screen shots illustrating the make new table query.

FIG. 4B is a flow diagram of the method add a table, which displays a table from the database 333 on the display device 309 so that a user of the computer 303 can retrieve columns from the table during a process of constructing a query. FIG. 15 illustrates the user interface of the method add a table. The user interface includes an add table window 1501 displayed on a query window 1503. The add table window displays a list of tables of the database in list box 1512. The query window 1503 includes an upper portion 1505 and a lower portion 1507. When the user highlights and selects orders table 1509 from the list box 1512, a column list box 1511 for the order table 335 is displayed in the upper portion 1505 of the query window 1503. The column list box 1511 for the orders table 335 lists all the columns of the orders table 335.

In step 401, the method add a table displays a list of existing tables stored in the database 333. In step 403, the method add a table receives a user selection of a table on the list by the user. In step 405, the method add a table displays a list of columns from the selected table. In step 407, the method add a table returns processing control to the method 347 to process user requests.

Figure 16:
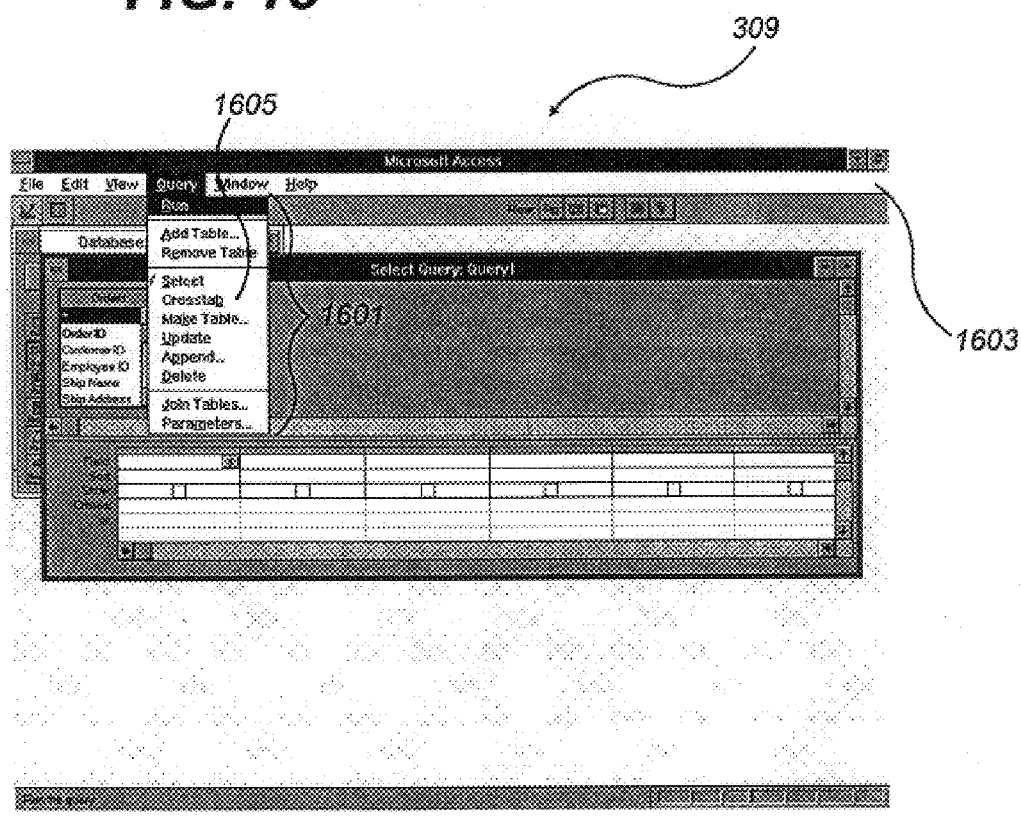
Figure 17:
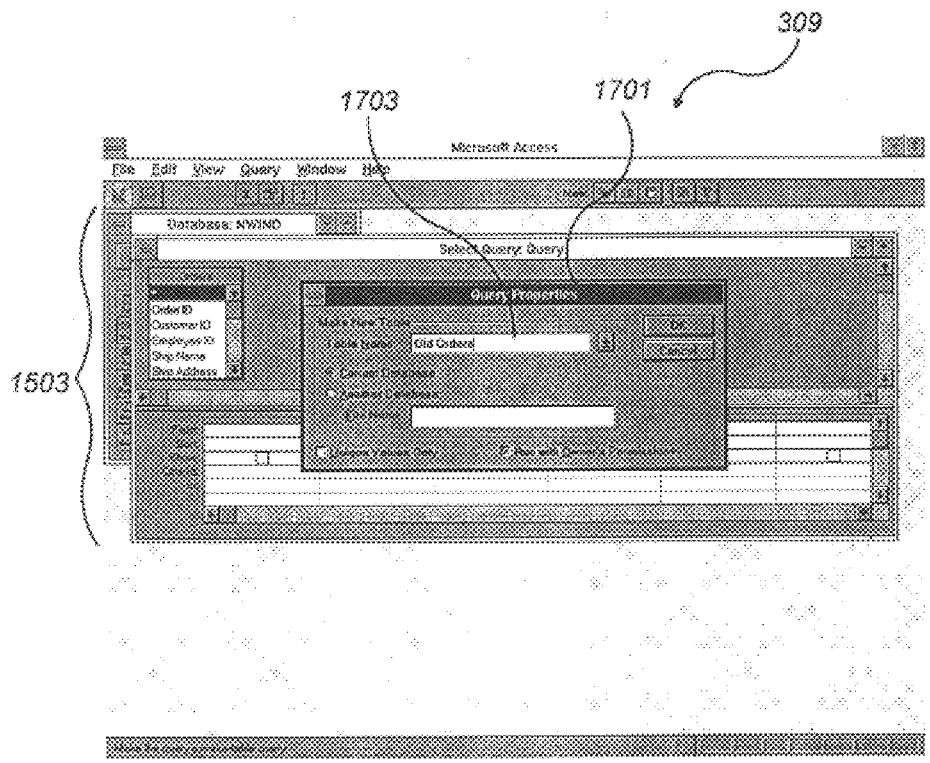
Figure 18:
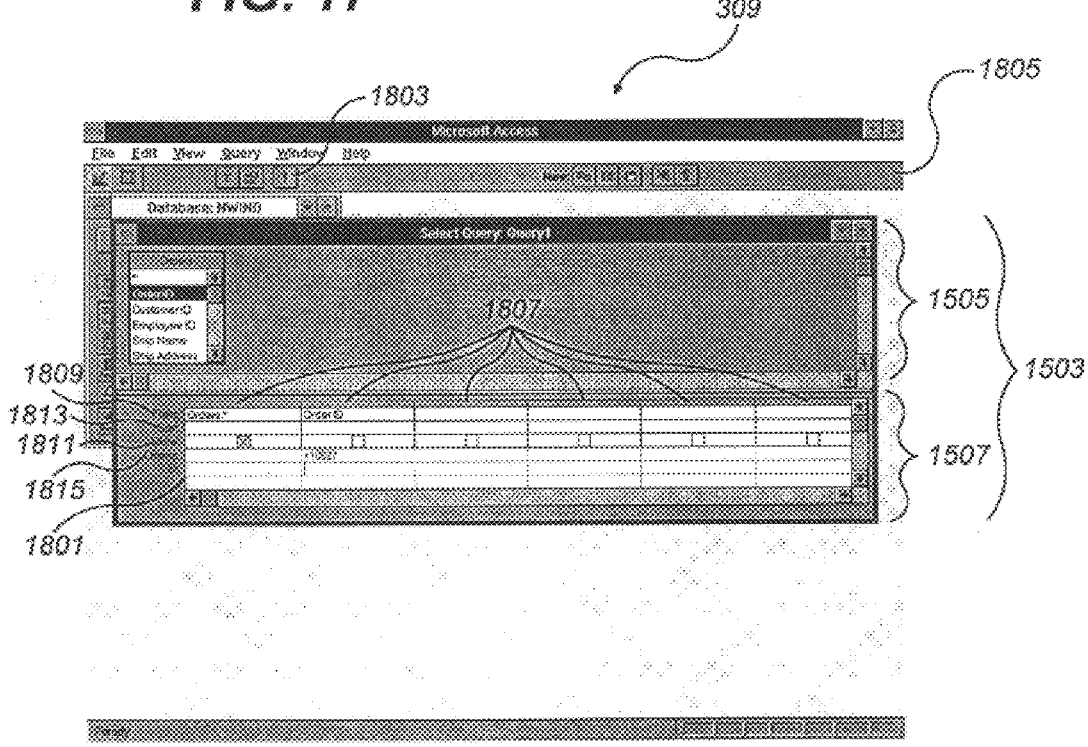

FIG. 5 is a flow diagram of the method make table query. The FIGS. 16–18 illustrate the screen displays of the method make table query. FIG. 16 illustrates the display device 309 after the user has selected the query pull down menu 1601 from the menu bar 1603. FIG. 17 illustrates a state of the display device 309 after the user selects a make table option 1605 from the query pull down menu 1601.

As FIG. 17 illustrates, a query properties dialogue box 1701 is displayed on the query window 1503. The user enters in a combo box 1703 of the query properties dialogue box 1701 a table name (such as "Old Orders") for the new table to be constructed by the method make table query.

FIG. 18 illustrates a state of the display device 309 after the user selects columns from the column list box 1511 for the order table 335 and drags the selected fields into a QBE grid 1801 stored in the lower portion 1507 of the query window 1503. When the user invokes a run bottom 1803 from a control bar 1805, the method make table query runs the query represented in the QBE grid 1801. When the method make table query ends processing, an old orders table 337 is stored in the database 333 of the computer 303.

The QBE grid 1801 provides a graphical representation of a query. Each QBE grid column 1807 contains information about a column included in the query. The field 1809 contains the name of the column included in the query. The Criteria field 1811 limits the query to records which satisfy criteria. For example, if the user only wants to see orderIDs with a value less than 10,000, then the user enters "<1000" in the criteria field 1811 of a column 1807 which contains information about orderIDs. The sort field 1813 sorts the data retrieved by the query. For example, sorting allows records to be placed in alphabetical order or in numeric sequence. The show field 1815 indicates which columns will be included in the new table.

The method make table query constructs a table by retrieving records specified in a query request and using the retrieved records to construct a new table. In step 507, the method make query table prompts the user for a name of the new table to be constructed by the make table query. In step 509, the method make query table receives the name of the new table. In step 511, the method make query table receives a selection of a column from the list of columns for the selected table. In step 513, the method make query table retrieves data from the selected columns of the selected table. In step 515, the method make query table stores the retrieved data in the new table. In step 517, the method make table query returns processing control to the method process user requests (FIG. 4A).

Figure 19:
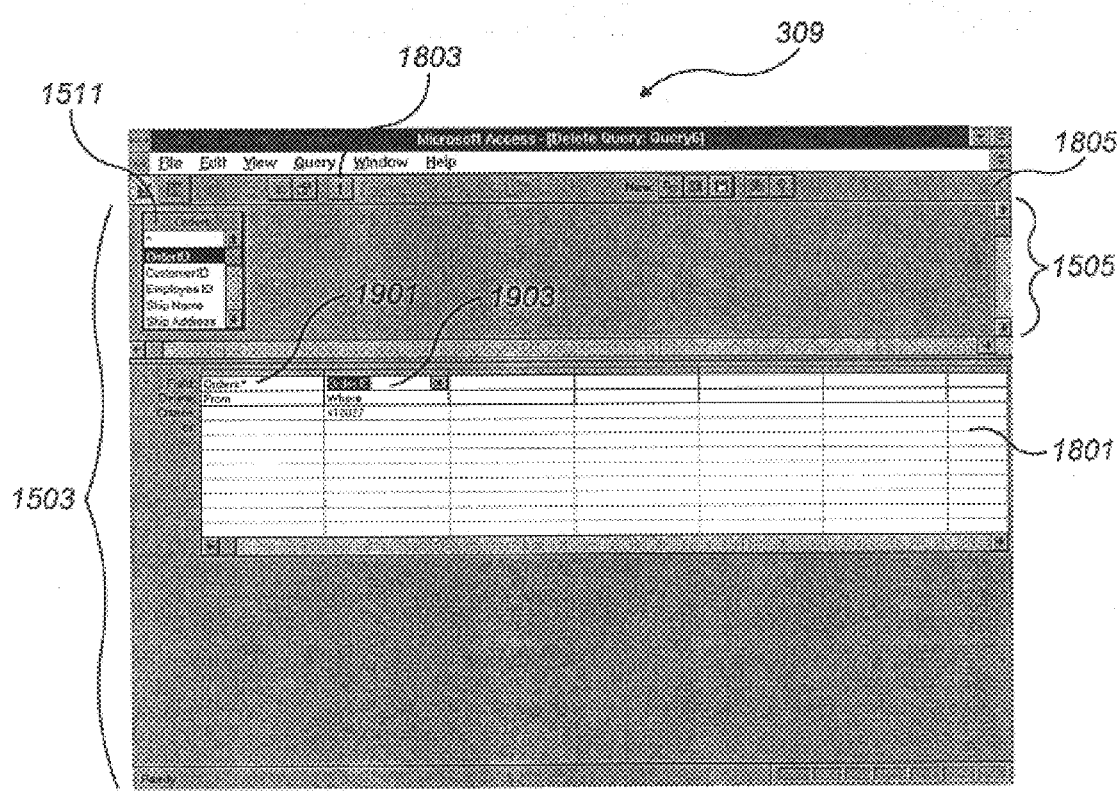
FIGS. 19–21 are screen shots illustrating the append query.

FIG. 6 is a flow diagram of the method delete query. The method delete query removes a number of records that meet a set of conditions specified in a query. FIG. 19 illustrates a screen display of the method delete query. FIG. 19 illustrates a state of the display device 309 after the column list box 1511 for the orders table has been added to the upper portion 1505 of the query window 1503. In addition, FIG. 19 illustrates a state of the display device 309 after an order column 1901 and an orderID column 1903 have been dragged from the column list box 1511 to the QBE grid 1801. After the user selects the run button 1803 from the command bar 1805, the method delete query removes the data indicated by the QBE grid 1801 from the orders table 335 of the database 333.

In step 607, the method delete queries receives a selection of a column from the list of columns. In step 609, the method delete query retrieves criteria which determines the records to delete. In step 611, the method delete query deletes records from the selected tables that satisfies the criteria. In step 613, the method delete query returns processing control to the method process user requests (FIG. 4A).

Figure 20:
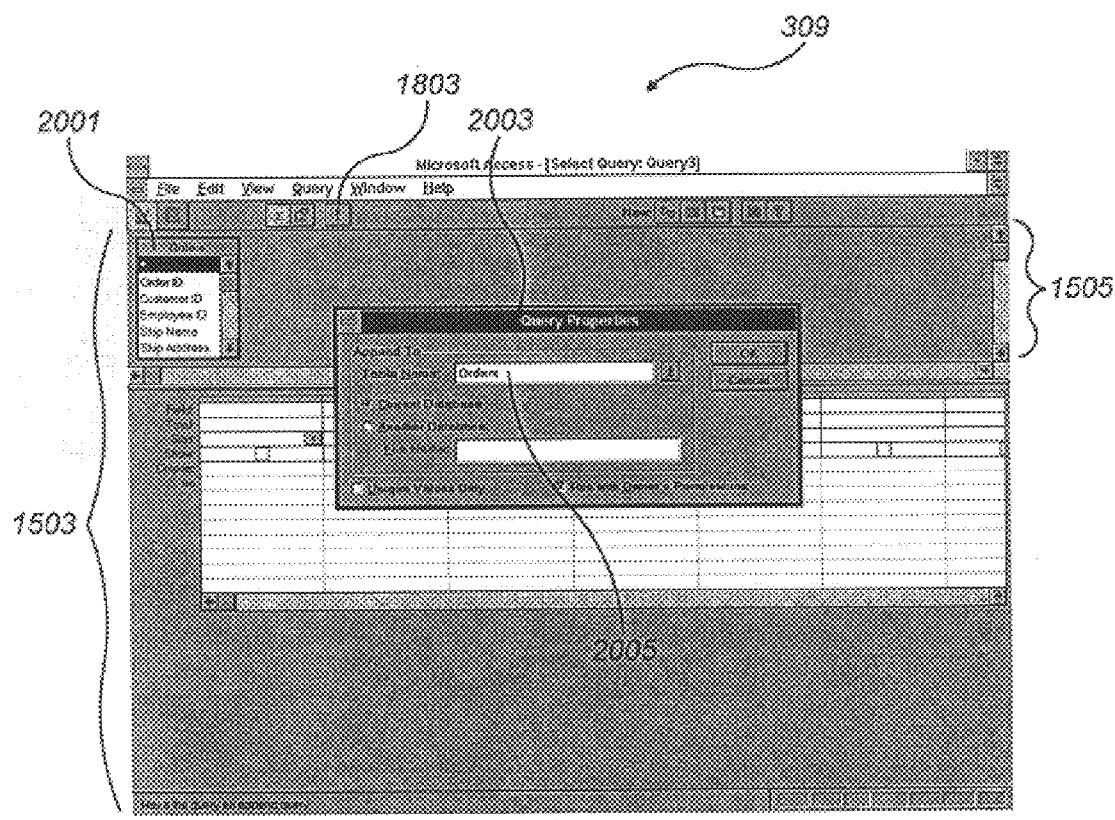
Figure 21:
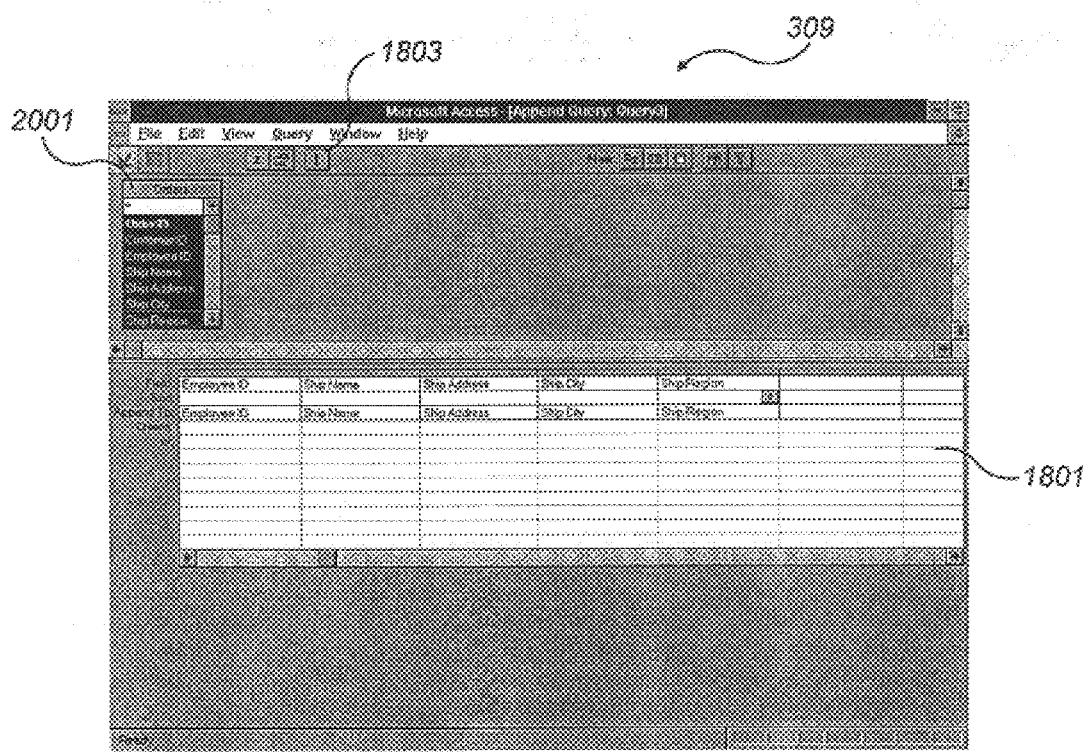

FIG. 7 is a flow diagram of the method append query. The method append query allows a user to add (append) records to an existing table. FIGS. 20 and 21 illustrate the screen displays of the method append query. FIG. 20 depicts a state of the display device 309 after a user has added a column list box 2001 for the old orders table 337 to the upper portion 1505 of the query window 1503. In addition, FIG. 20 illustrates a state of the display 309 after the method append query displays a query properties dialogue box 2003 on the query window 1503. Finally, FIG. 20 illustrates that the user has entered the name of the orders table 335 in the combo box 2005, thus indicating that data from the old orders table 337 will be appended to the orders table 335. FIG. 21 illustrates a state of the display device 309 after the user selects columns from the column list box 2001 for the old orders table 337 and drags the selected columns into the QBE grid 1801. When the user invokes the run button 1803 the method append query appends records from the old orders table 337 into the orders table 335.

In step 707, the method append query prompts the user for the name of an appendee table that will have records appended to it. In step 709, the method append query receives a name of the appendee table. In step 711, the method append query receives a selection of columns from the appender table (i.e., the table from which data will be taken to append to the appendee table). In step 713, the method append query retrieves records from the appender table and appends the retrieved records to the appendee table. In step 715, the method append query returns processing control to the method process user requests.

Figure 22:
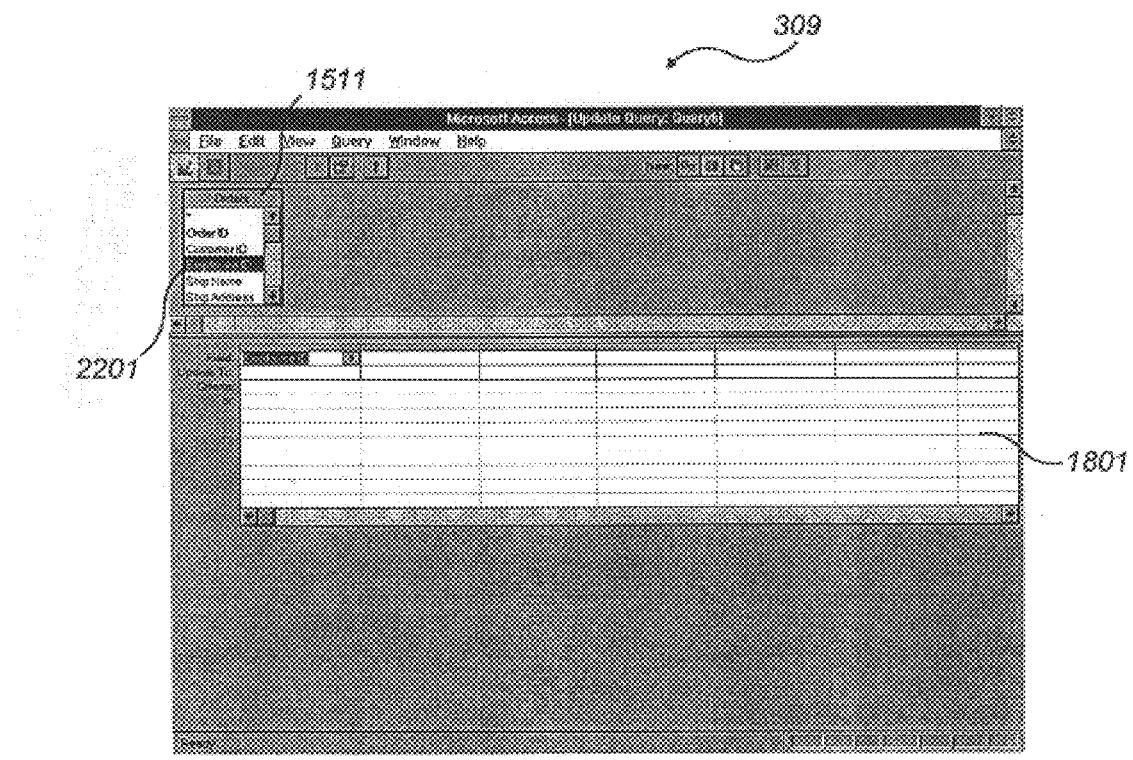
FIGS. 22 and 23 are screen shots illustrating the update query.
Figure 23:
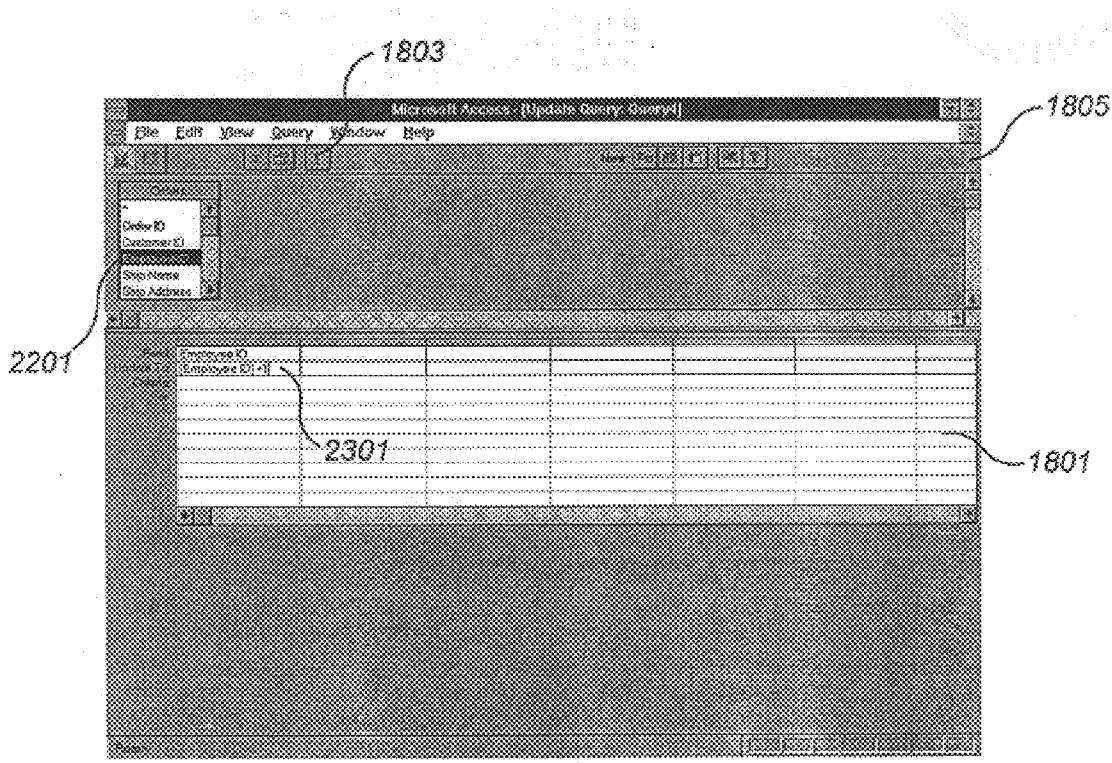

FIG. 8 is a flow diagram of the method update query. The method update query allows a user to change data in existing tables. FIGS. 22 and 23 illustrate screen displays for the method update query. FIG. 22 illustrates a state of the display device 309 after the user drags the employeeID column 2201 from the column list box 1511 for the orders table 335 to the QBE grid 1801. FIG. 23 illustrates a state of the QBE grid 1801 after the user has entered a formula 2301 which indicates that the employeeID column 2201 of the orders table 335 should be incremented by one. When the user selects the run button 1803 from the control bar 1805, each employeeID in the orders table 335 is incremented by one.

In step 807, the method update query receives a selection of a column from the list of columns. In step 809, the method update query prompts a user to define how to update the selected column. In step 811, the method update query updates the fields of the selected column in the selected table according to the selection criteria. In step 813, the method update query returns processing control to the method process user requests.

Figure 24:
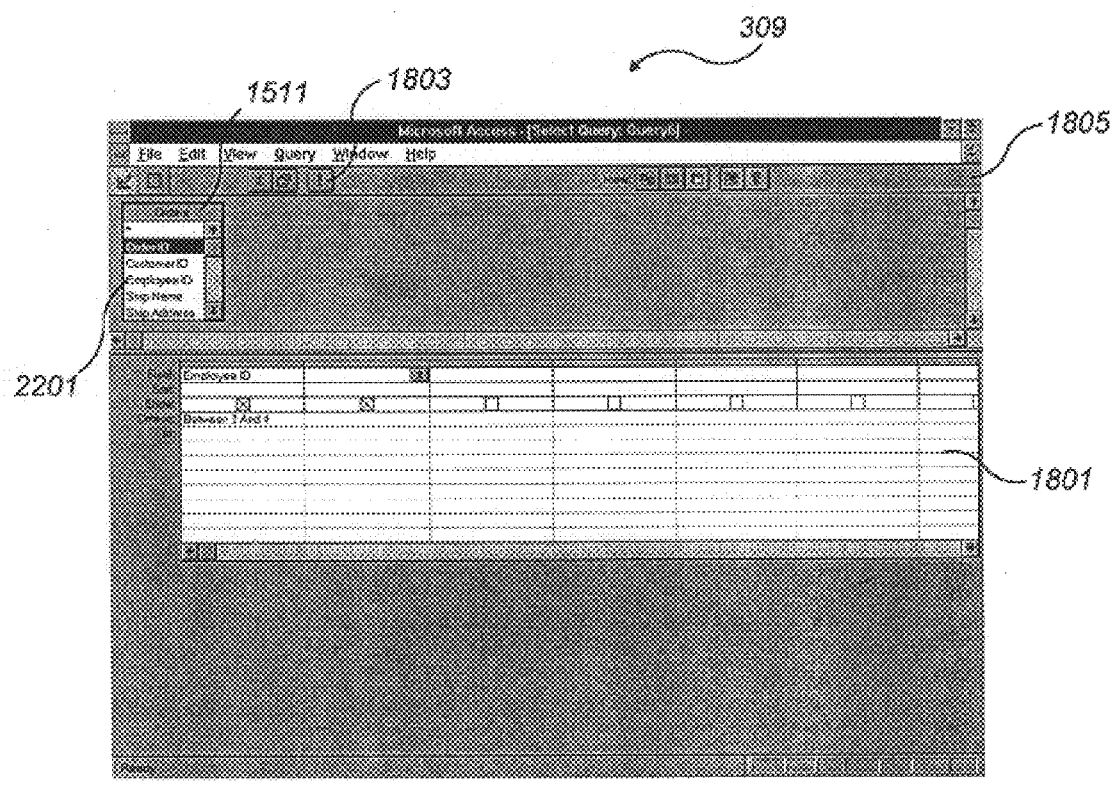
FIG. 24 is a screen shot illustrating the select query.

FIG. 9 is a flow diagram of the method 323 for a select query. The method 323 for a select query allows users to retrieve data from tables based on a specified set of criteria. FIG. 24 illustrates screen displays for the method select query. FIG. 24 depicts a state of the display device 309 after the user selects an employeeID column 2401 from the column list box 1511 and drags the employeeID column 2401 into the QBE grid 1801. In addition, FIG. 24 depicts a state of the display device 309 after the user selects criteria that will determine which records will be retrieved from the orders table 335. In the example depicted in FIG. 24, records with employeeID fields having a value between two and four will be retrieved from the orders table 335 after the user invokes the run button 1803 from the control bar 1805.

In step 907, the method select query receives a selection of a column from the list of columns. In step 909, the method select query prompts the user to provide criteria which defines the rows to retrieve from the selected table. In step 911, the method select query retrieves selected columns from records of the selected table that satisfies the criteria. In step 913, method select query returns processing control to the method process user requests (FIG. 4A).

Figure 25:
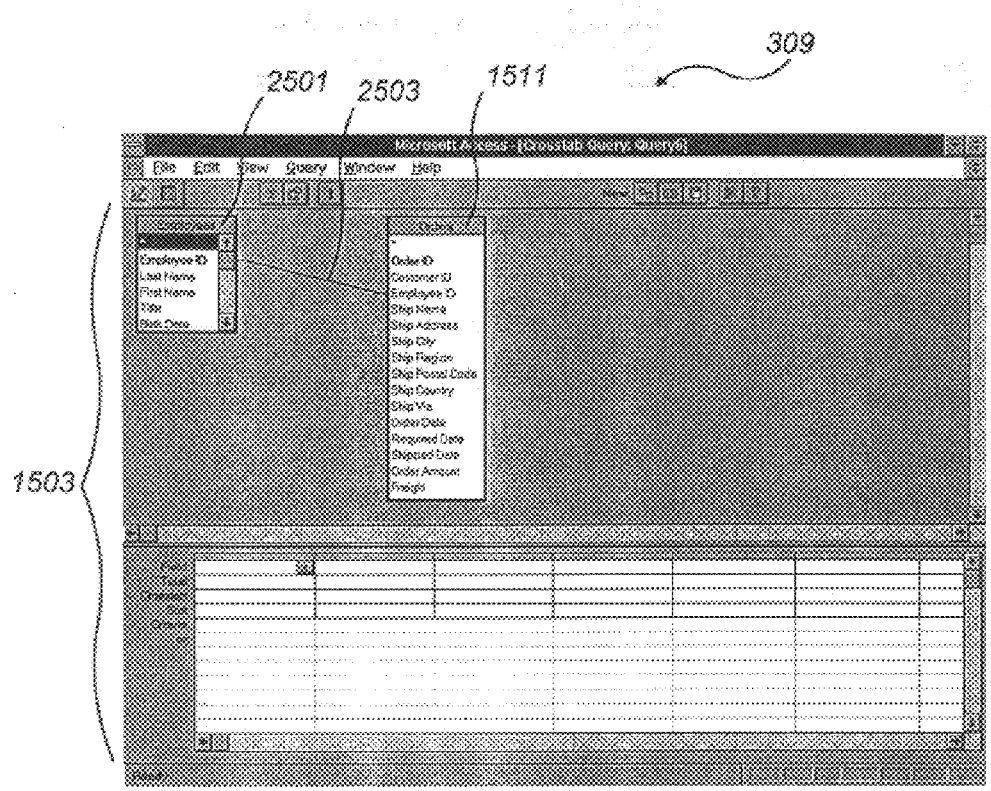
FIGS. 25–32 are screen shots illustrating the crosstab query.

FIG. 10 is a flow diagram of the method crosstab query. The method crosstab query presents data from tables in a spreadsheet-like manner. FIGS. 25–32 illustrate the screen displays of the method cross table query. FIG. 25 illustrates a state of the display device 309 after the user adds the column list box 1511 for the orders table 335 and the column list box 2501 for the employees table 339 to the upper portion 1505 of the query window 1503. A join line 2503 connects a selected column in the column list box 2501 with a selected column in the field list box 1511. In the example depicted in FIG. 25, the selected columns are the employeeID columns of the respective column list boxes. Join lines represent database table joins. In most cases, a join line indicates to select that records from both tables that have the same value in the fields for the selected columns that are joined.

Figure 26:
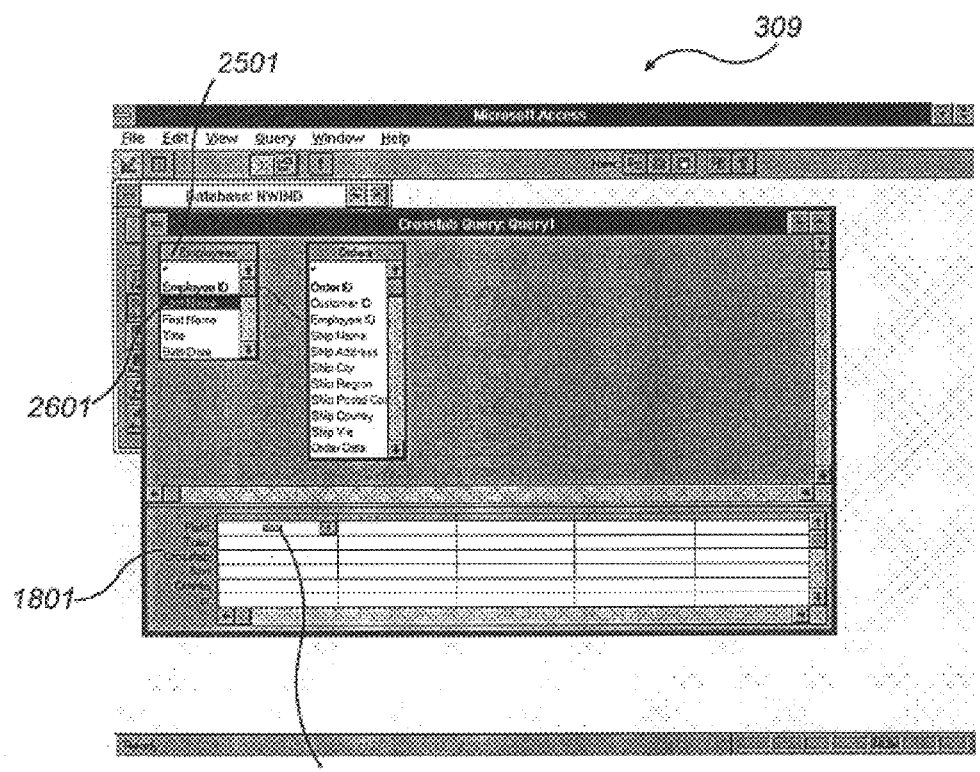
Figure 27:
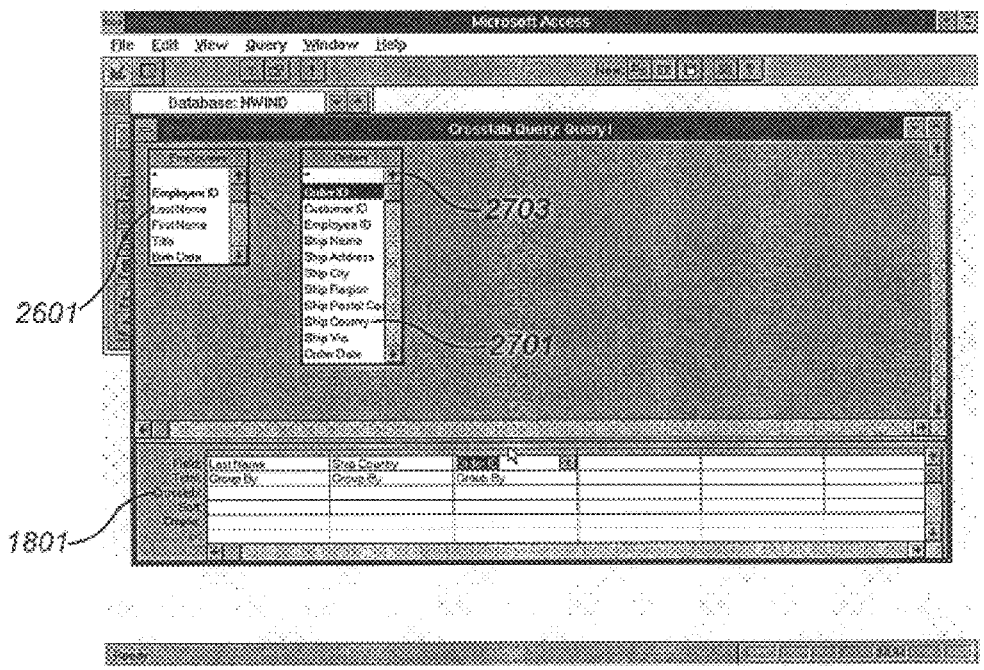

FIG. 26 depicts a state of the display device 309 after the user selects a last name column 2601 from the column list box 2501 and drags the last name column 2601 into the QBE grid 1801 where it is represented as icon 2603. FIG. 27 depicts a state of the display device 309 after the user completes dragging the last name columns 2601, a ship country column 2701 and an orderID column 2703 into the QBE grid 1801.

Figure 28:
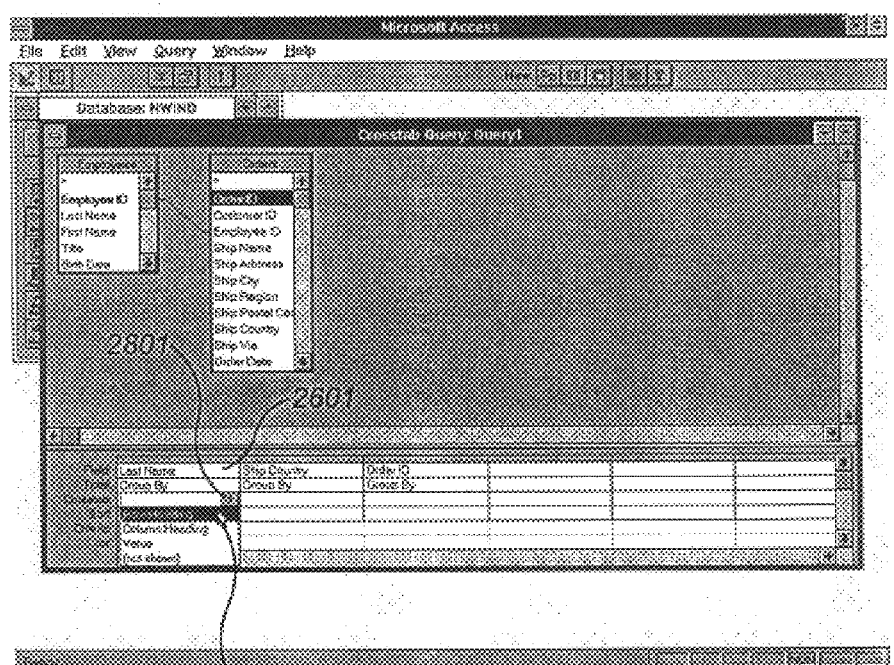

FIG. 28 depicts a state of the display device 309 as the user selects the last name column 2601 as the column Name to use for the row heading. The user accomplishes this by clocking on the combo box 2801 and selecting the row heading 2803.

Figure 29:
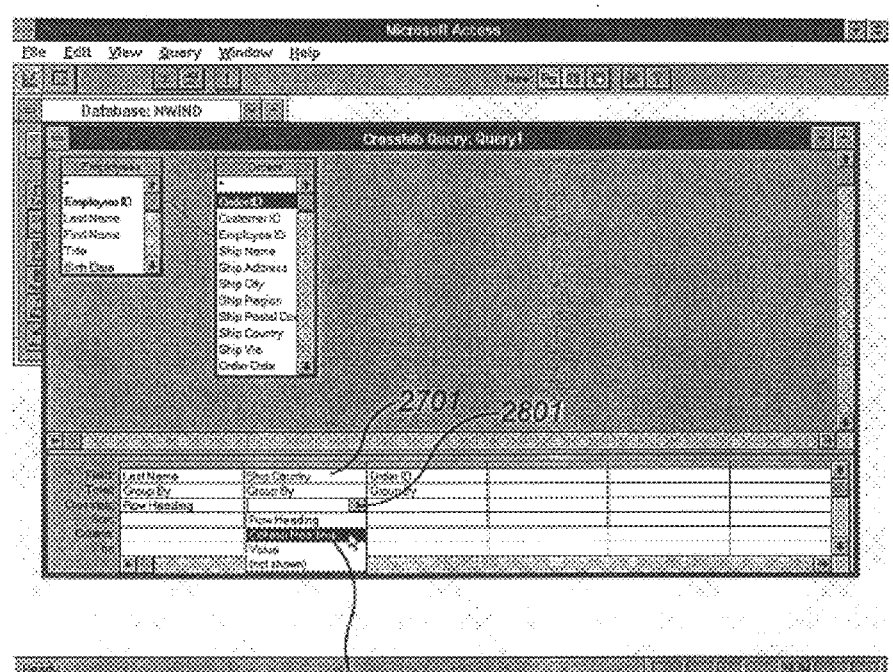

FIG. 29 depicts a state of the display device 309 as the user selects the ship country column 2701 as the column to use for the column heading of the crosstab query table. The user accomplishes this by clicking the mouse 305 on the combo box 2801 and selecting the column heading entry 2901.

Figure 30:
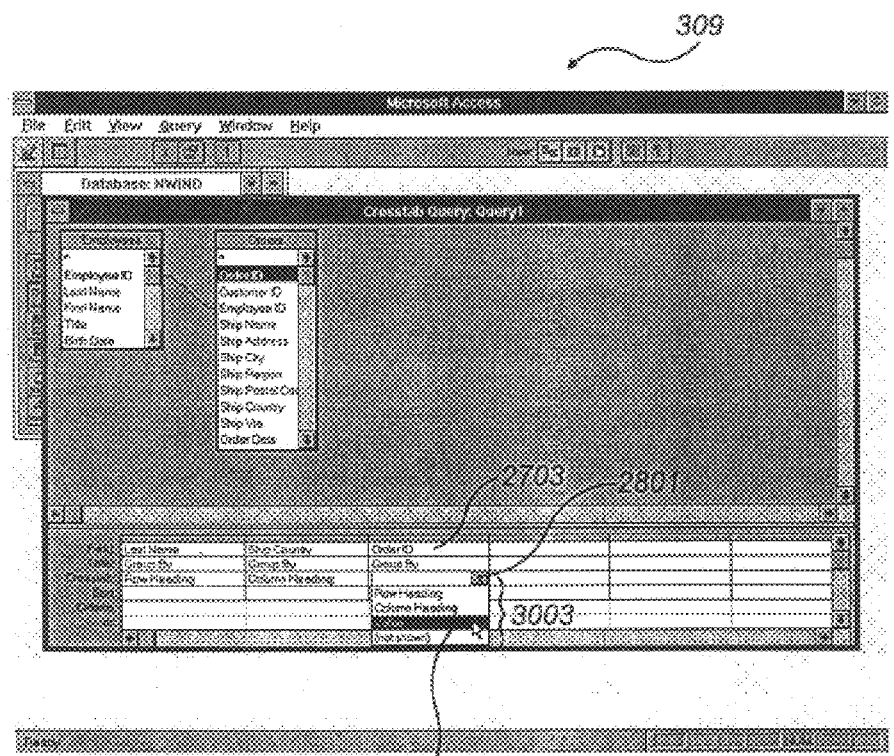
Figure 31:
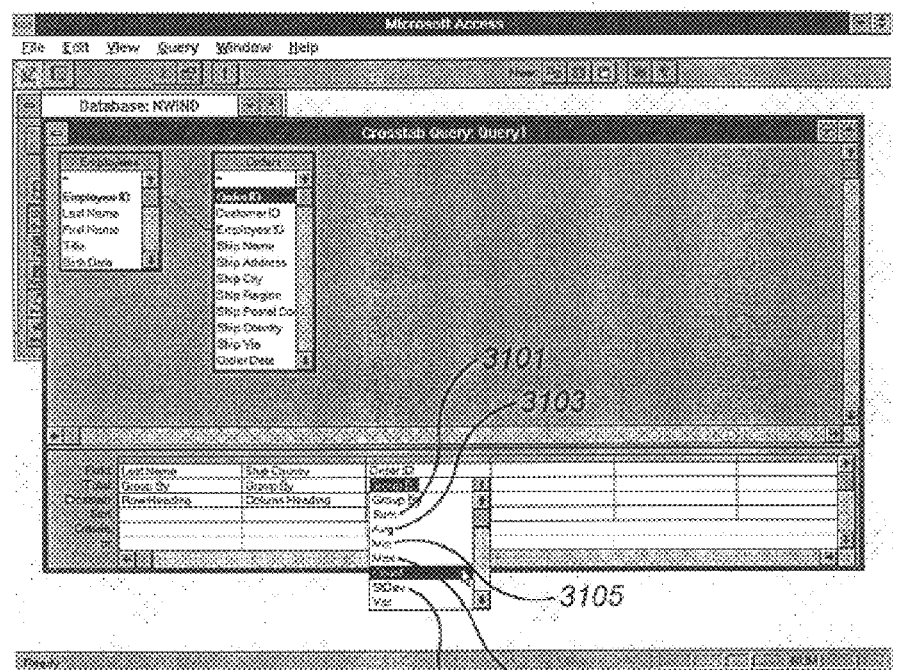

FIG. 30 depicts a state of the display device 309 as the user selects the orderID column 2701 for the column to use for summary values. The user then selects the value entry 3001 from the drop down menu which was accessed by clicking the mouse 305 on the combo box 2801. FIG. 31 depicts a state of the display device 309 as the user is choosing how to aggregate the data for the crosstab query. For example, the data can be aggregated as a sum 3101, an avg 3103, a min 3105, a max 3107, and a standard deviation 3109.

Figure 32:
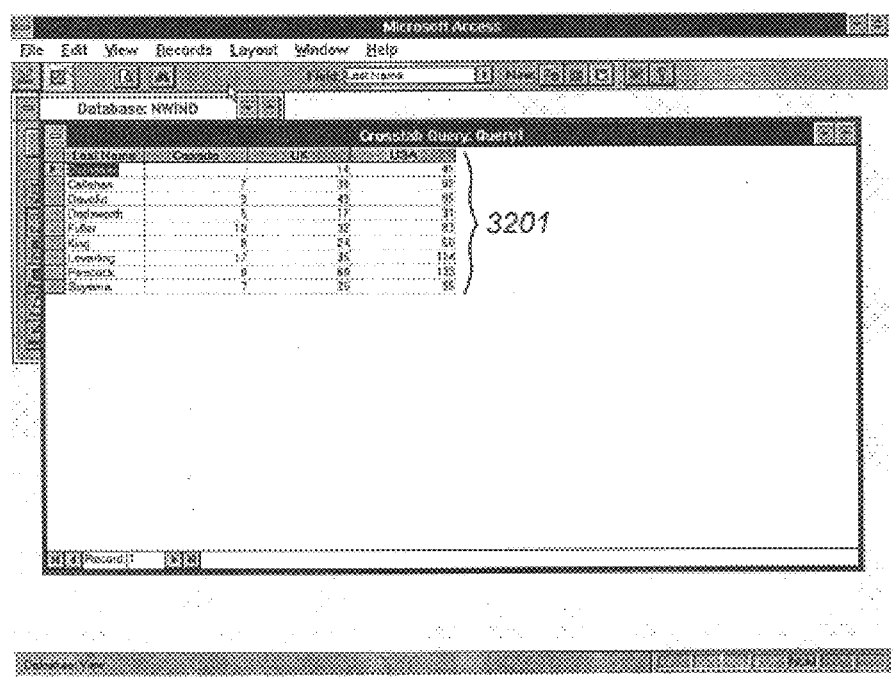

FIG. 32 depicts a state of a crosstab table 3201 after the user invokes the crosstab query illustrated in FIGS. 25–31.

In step 1007, the method crosstab query joins together one column in each of two tables so that records are selected from both tables that have the same value in the fields for the columns that are joined. In step 1009, the method crosstab query receives a selection of columns from the list of columns. In step 1011, the method crosstab query receives a choice of a first selected column to use for row headings. In step 1013, the method crosstab query receives a choice of a second selected column to use for column headings. In step 1015, the method crosstab query receives a choice of a data format in which to place data from a third selected column. In step 1017, the method crosstab query constructs a crosstab query table containing the chosen row headings, column headings and data format. In step 1019, the method crosstab query returns processing control to the method process user requests (FIG. 4A).

Figure 33:
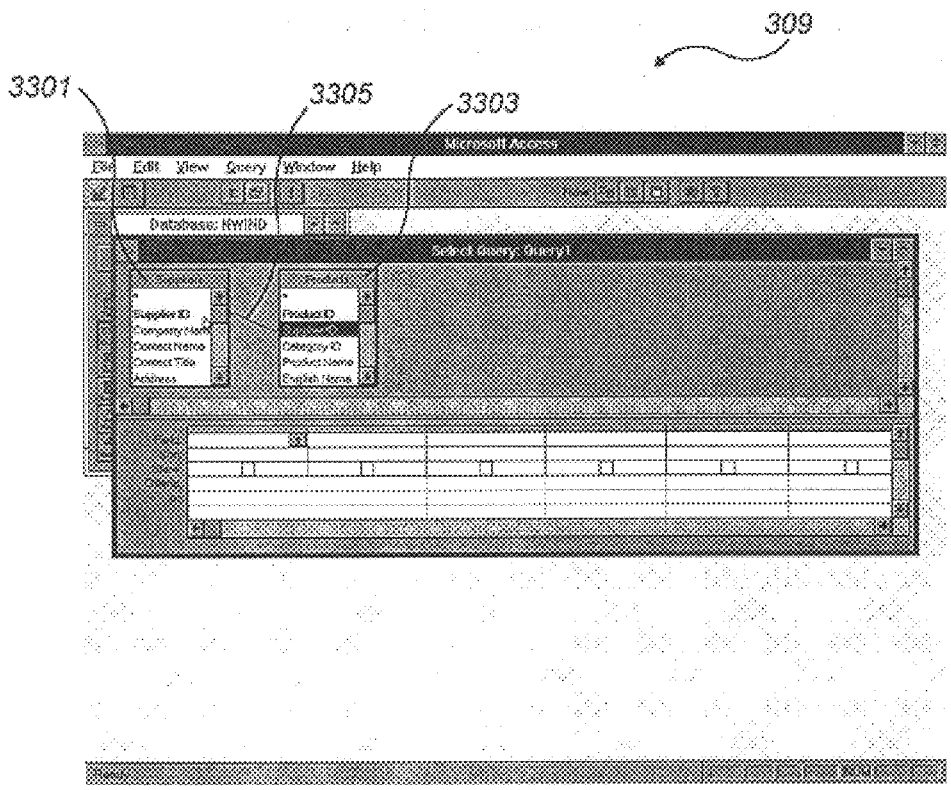
FIGS. 33–36 are screen shots illustrating an equi-join query.

FIG. 11 is a flow diagram of the method equi-join query. The method equi-join query selects and displays all records from one table that have matching records in another table. FIGS. 33–36 illustrate the screen displays of the method equi-join query. FIG. 33 illustrates a state of the display device 309 after the user adds a column list box 3301 for the suppliers table 341 and a column list box 3303 for the products table 343. As FIG. 33 illustrates, the two tables are joined via a join line 3305 that connects supplierID columns in both tables.

Figure 34:
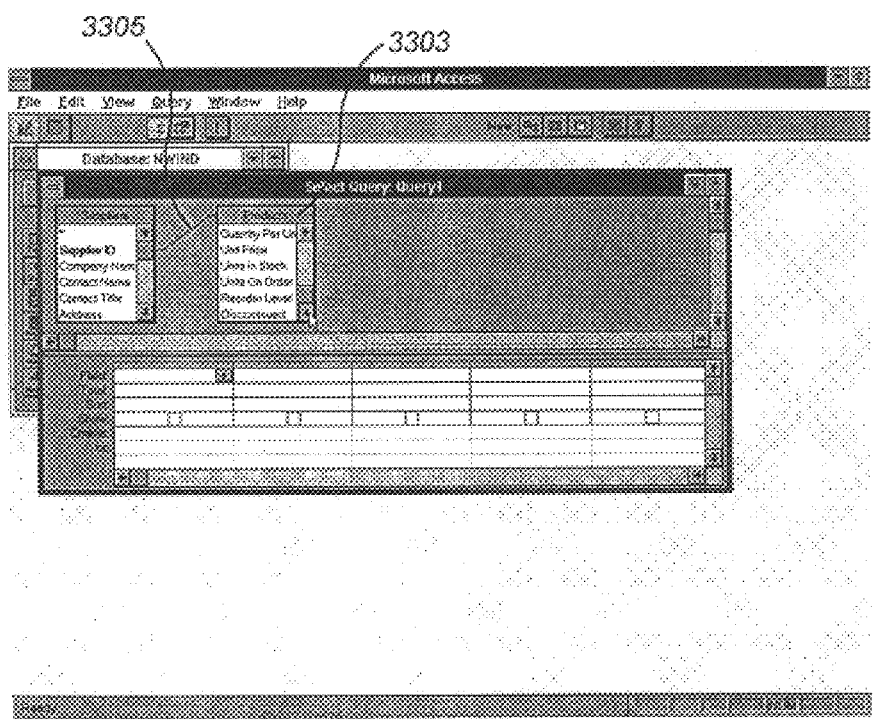

FIG. 34 illustrates a feature of the present invention which maintains the display of a join line even when one or both of the joined columns are scrolled such that they cannot be seen on a column list box.

Figure 35:
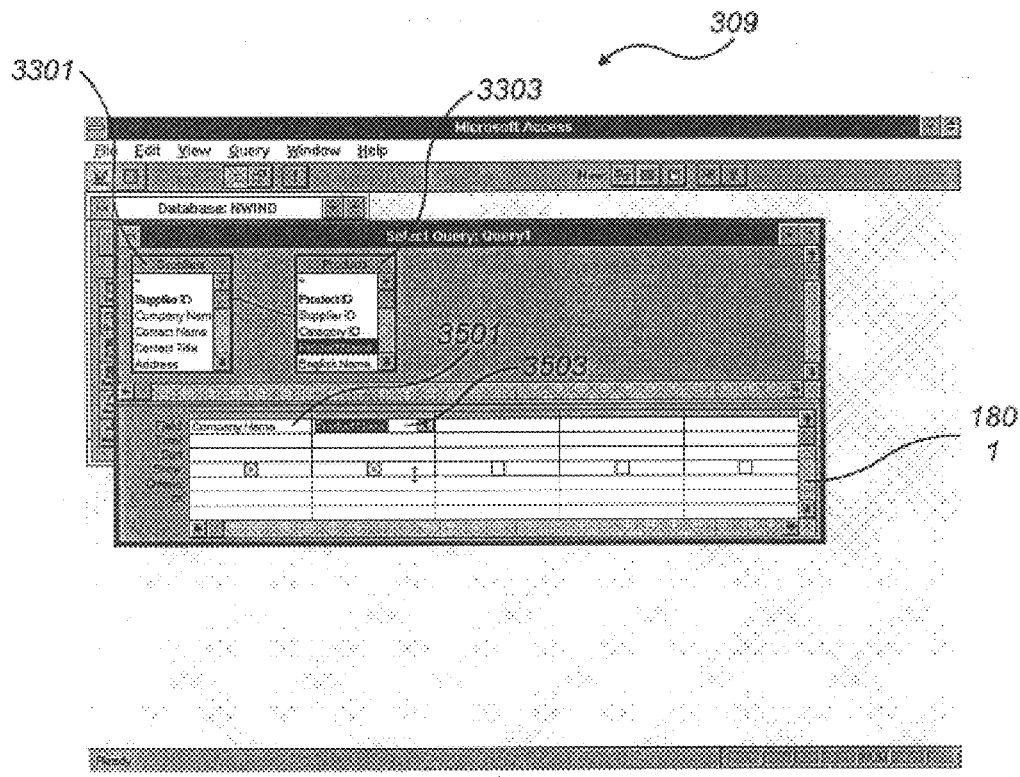
Figure 36:
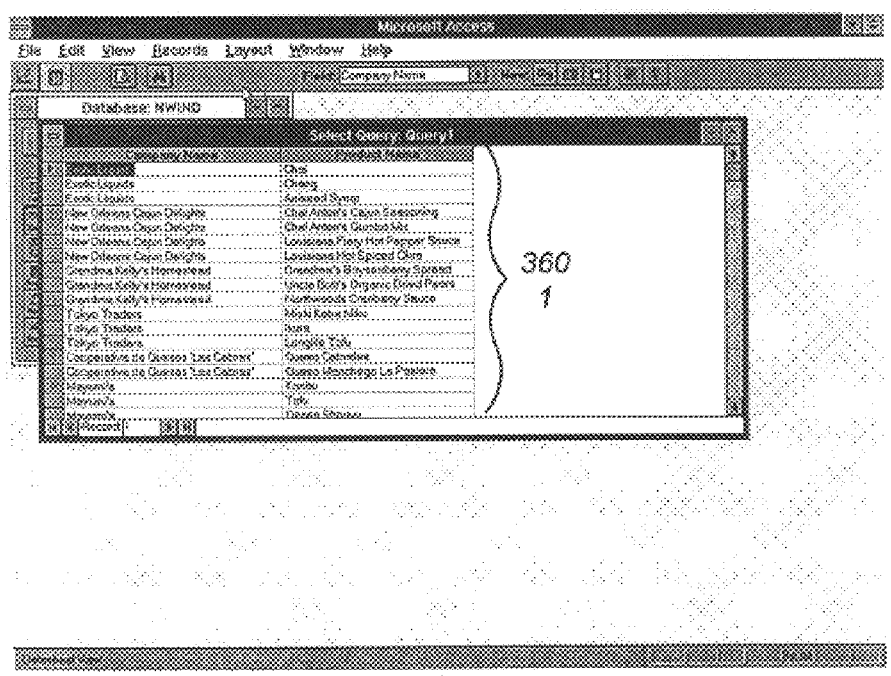

FIG. 35 depicts a state of the display device 309 after a company name column 3501 and a product name column 3503 have been dragged from the column list box 3301 and the column list box 3303, respectively, and inserted into the QBE grid 1801. FIG. 36 depicts a table 3601 which contains results from the equi-join query.

In step 1107, the method equi-join query joins a column in the first selected table with a column in the second selected table so that records are selected from both tables that have the same value in the columns that are joined. In step 1109, the method equi-join query receives a selection of columns from a list of columns. In step 1111, the method equi-join query selects records from both selected tables that have the same value in the fields of the columns that are joined. In step 1113, the method equi-join query returns processing control to the method process user requests (FIG. 4A).

Figure 37:
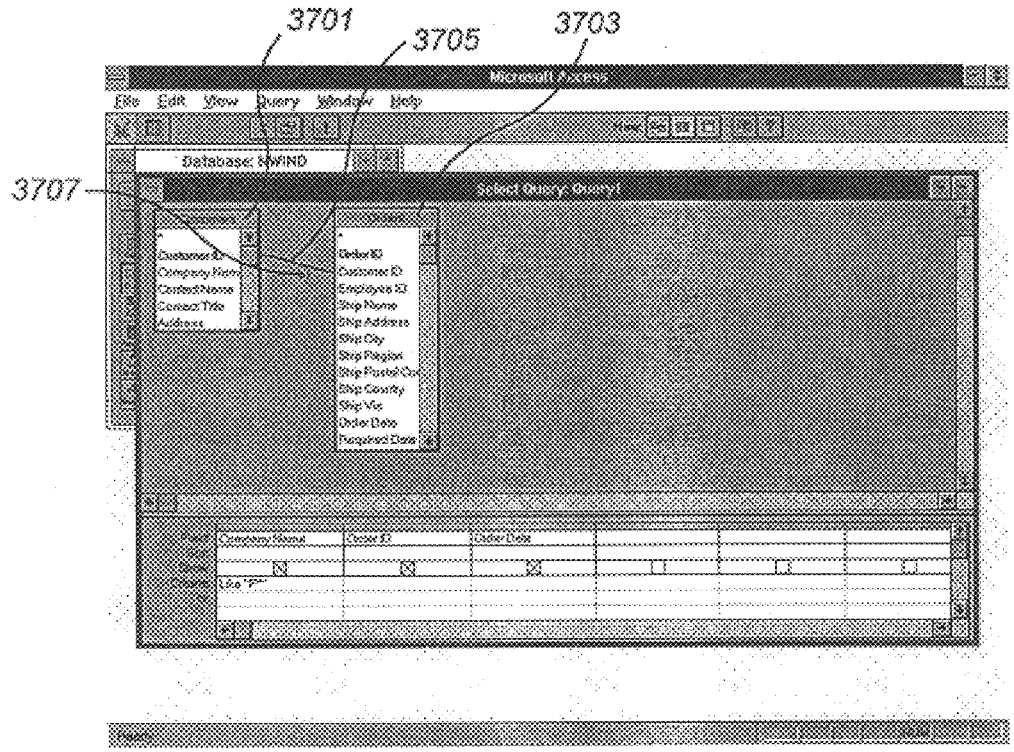
FIGS. 37–39 are screen shots illustrating an outer-join query.
Figure 38:
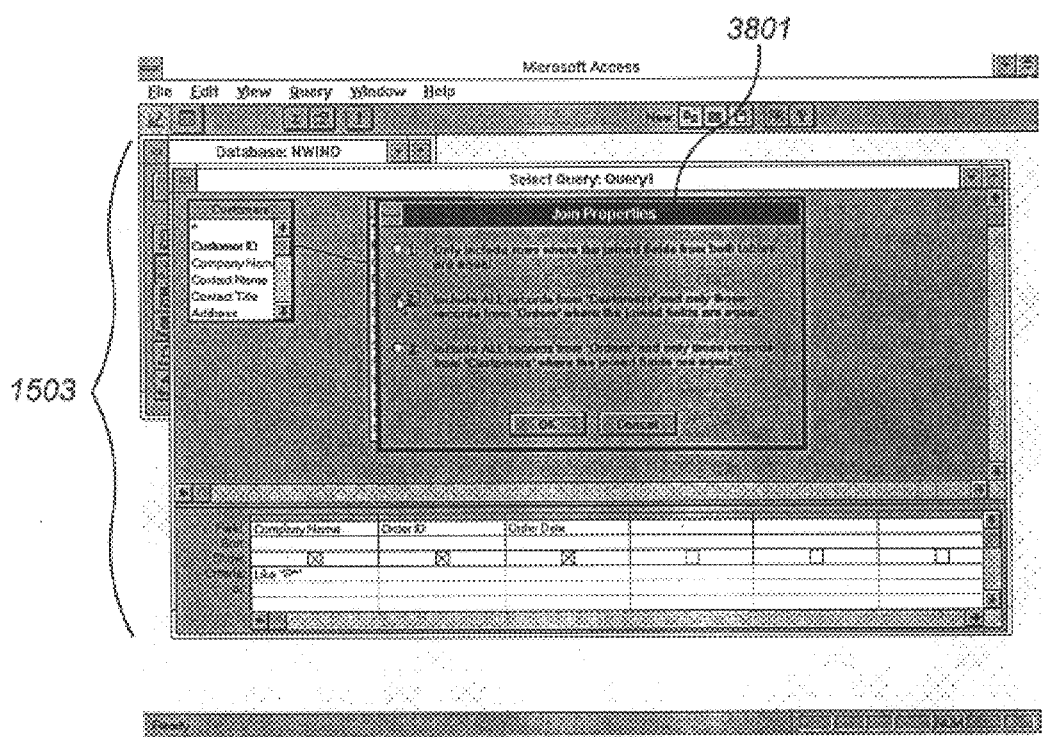

FIG. 12 is a flow diagram of the method outer-join query. The method outer-join query retrieves and displays all records from one table and only those records from the other table where values in a preselected set of fields are equal. FIG. 37 depicts a list box 3701 for the customers table 345 and a column list box 3703 for the orders table 335 which are connected by a join line 3705. By positioning the cursor 3707, using the mouse 305, over the join line 3705, and double clicking on the mouse 305, a join properties window 3801 (FIG. 38) appears on the query window 1503. Turning to FIG. 38, by choosing option 2 on the join properties window 3801 the user indicates that an outer-join query should be constructed between the customers table 345 and the orders table 335.

Figure 39:
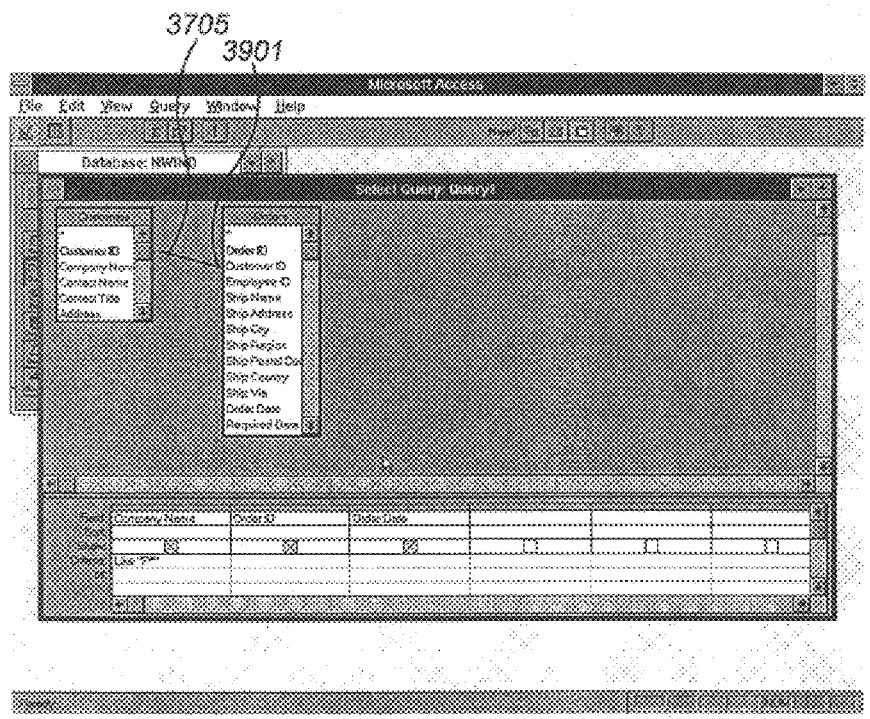

FIG. 39 illustrates that an arrow 3901 on the join line 3705 points from the table for which all records are displayed to the table for which selected records are displayed. In step 1207, the method outer-join query receives a selection of a pair of fields to join. In step 1209, the method outer-join query joins the selected pair of fields. In step 1211, the method outer-join receives a selection of columns for the outer-join query. In step 1213, the method outer-join query, for the columns selected for the outer-join query, retrieves all records from the first selected table and only those records from the second selected table for which values in the joined columns are equal. In step 1215, the method outer-join query returns processing control to the method process user requests (FIG. 4A).

Figure 40:
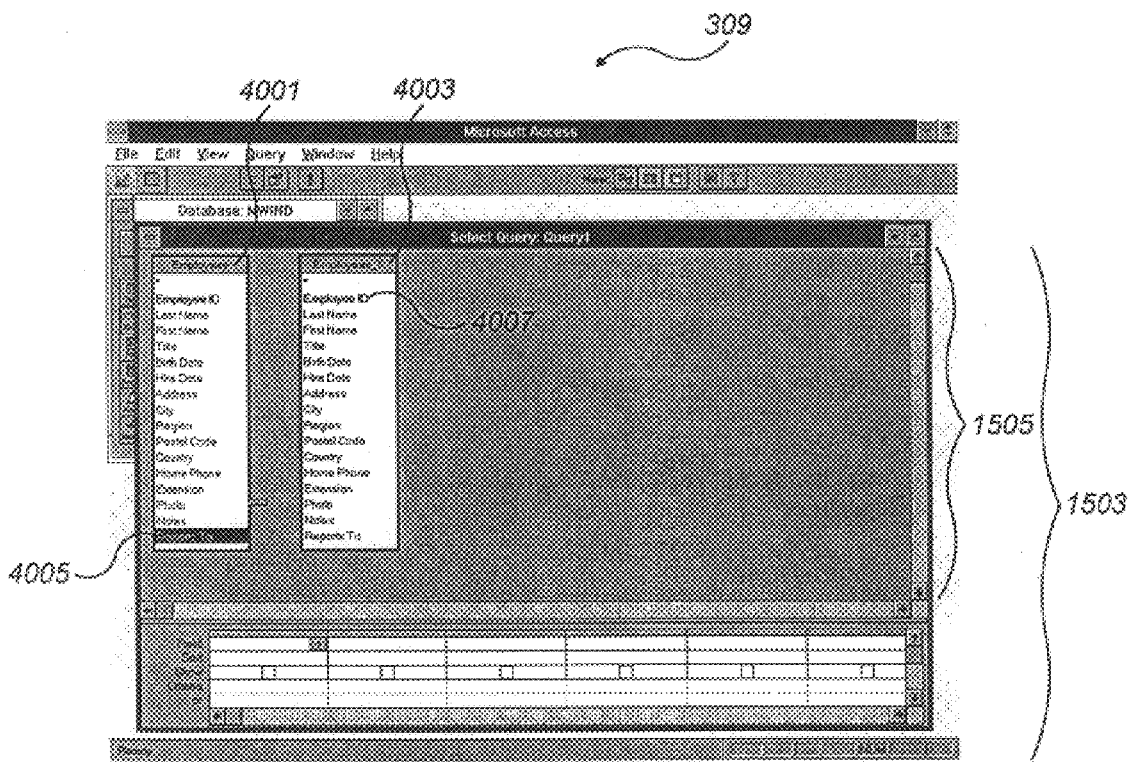
Figure 41:
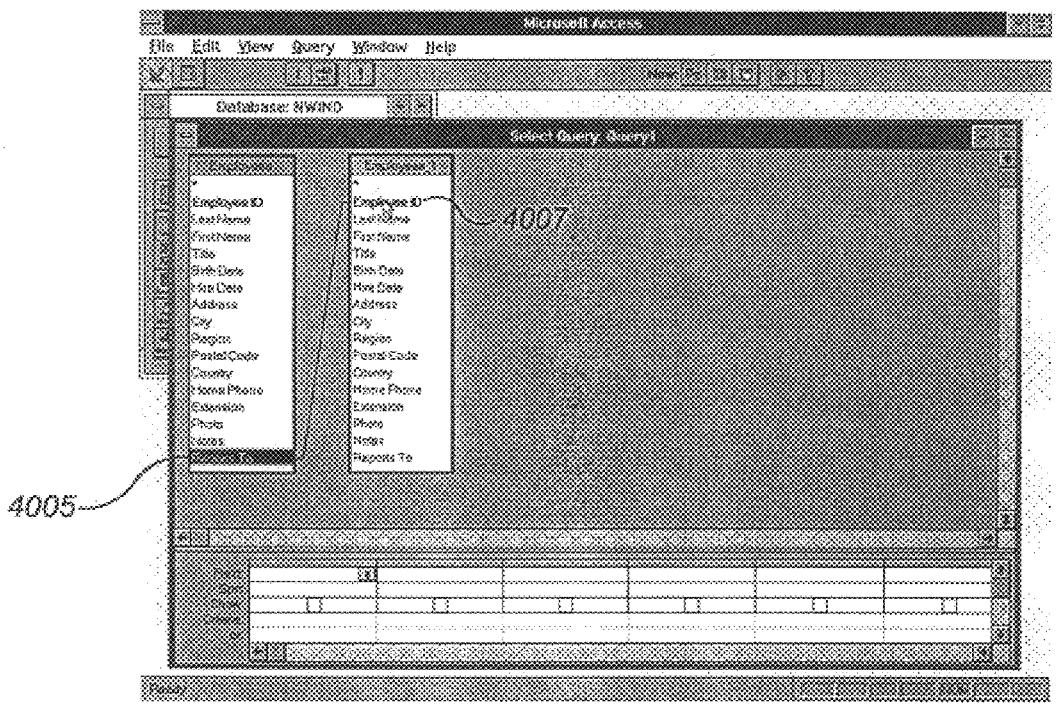

FIG. 13 is a flow diagram of the method self-join query. A self-join refers to the joining of a table to itself. FIGS. 40–41 illustrate screen displays of a self-join query. A self-join is used, for example, when a user wants to construct a query which retrieves an employeeID and last name for each employee and the employee's manager (if they have a manager).

First, the user adds two copies of a column list box 4001 and 4003 for the employees table 339 into the query window 1503. Then the user joins a ReportsTo column 4005 in a column list box 4001 for the employees table 339, with an EmployeeID column 4007 in column list box 4210 (see FIGS. 40 and 41).

Figure 42:
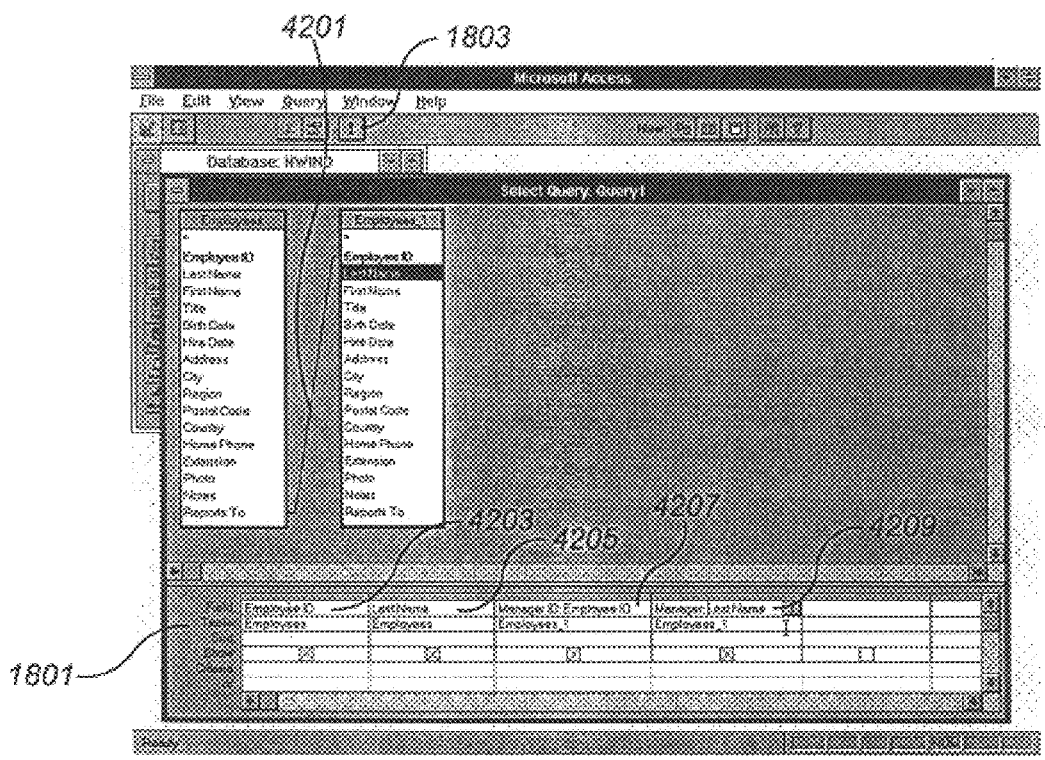

Next, the user drags EmployeeID column 4203 and a LastName column 4205 from the column list box 4001 to the QBE grid 1801, and the EmployeeID column 4207 and a LastName column 4209 from the column list box 4003 into the QBE grid 1801 (see FIG. 42). By invoking the run button 1803 and query lists all employees and their managers (if any).

In step 1307, the method self-join query receives a selection of a pair of columns to join. In step 1309, the method self-join query joins the pair of selected columns. In step 1311, the method self-join query receives a selection of columns for the self-join query. In step 1313, the method self-join query, for the columns selected for the self-join query, retrieves all records that satisfy the self-join criteria. In step 1313, the method self-join query returns processing control to the method process user requests.

Figure 43:
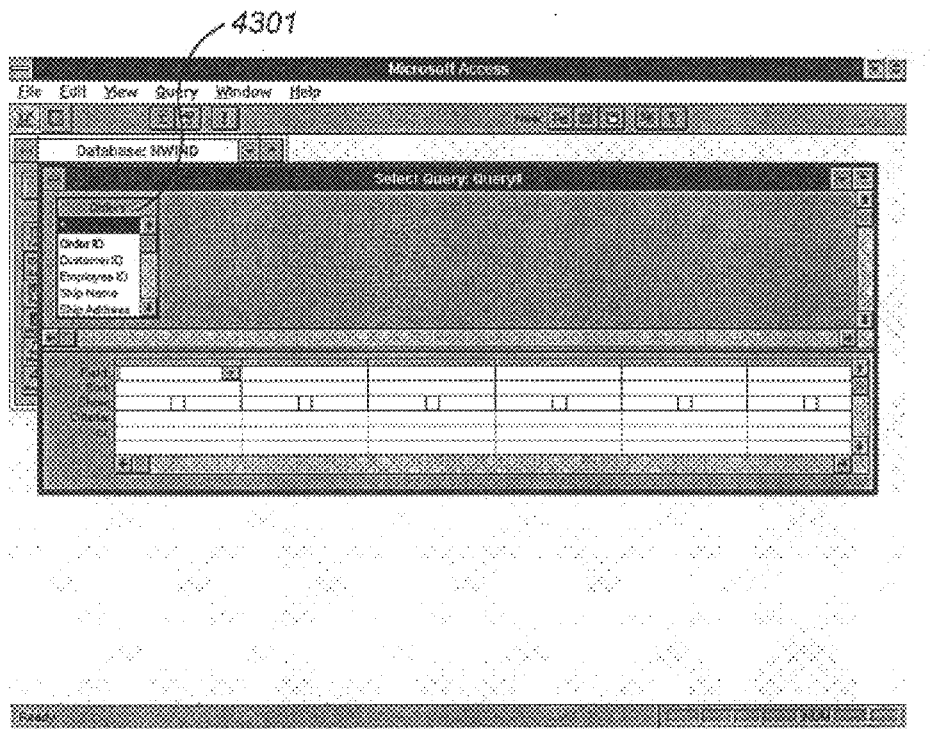
FIGS. 43–49 are screen shots illustrating an SQL view query.
Figure 44:
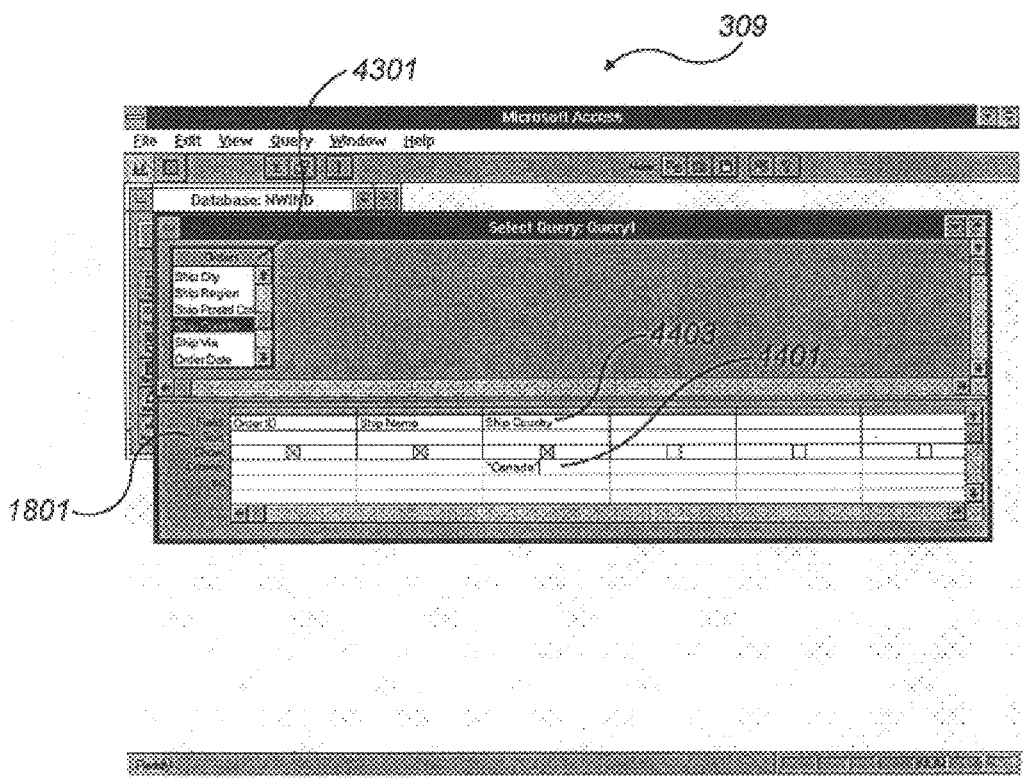

FIG. 14 is a flow diagram of the method view SQL query. The method view SQL query allows a user to make changes to an SQL statement and then incorporates those changes into a QBE grid which visually represents the query on the display device 309. FIGS. 43–49 illustrate screen displays of the method query SQL view. FIG. 43 illustrates a column list box 4301 for the orders table 335. FIG. 44 illustrates a state of the display device 309 after the user drags columns from the column list box 4301 into the QBE grid 1801. FIG. 44 also illustrates that a criteria field 4401 for a ship country column 4403 has been set to the value "Canada."

Figure 45:
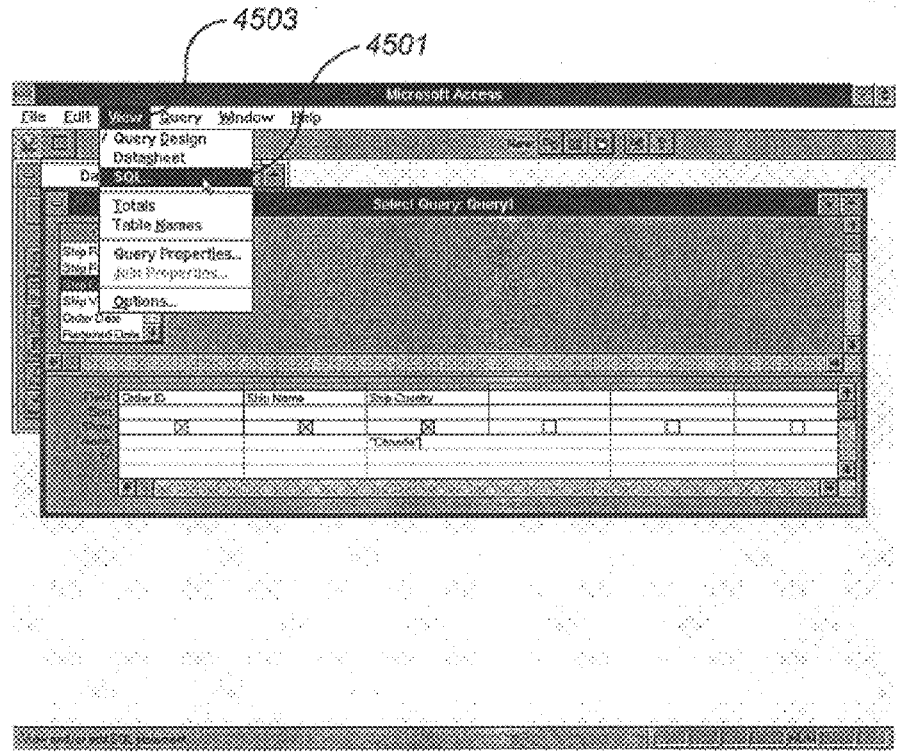
Figure 46:
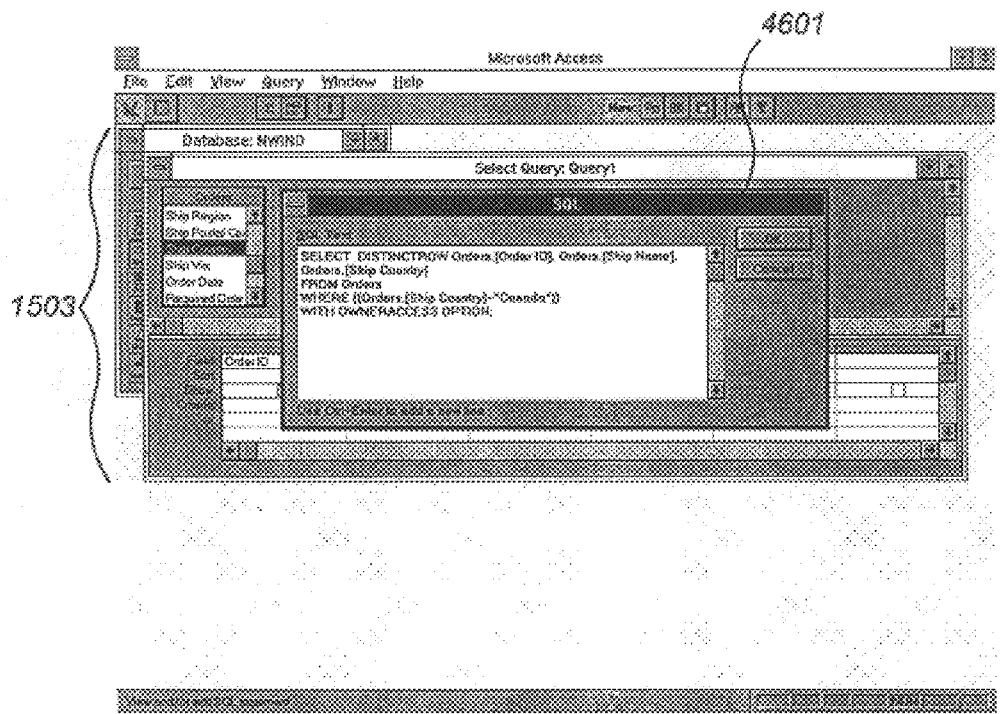
Figure 47:
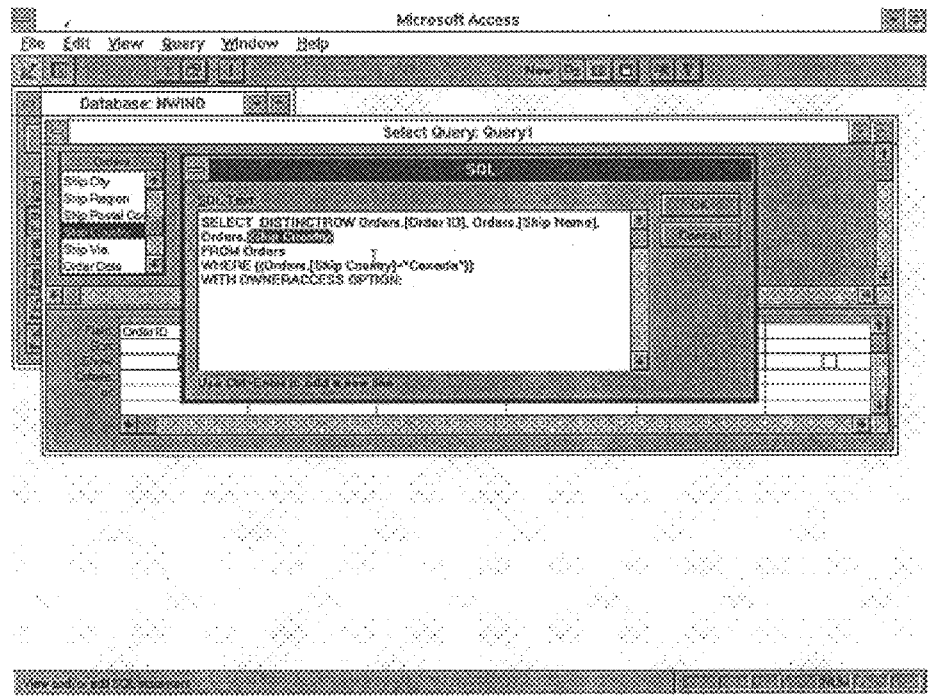
Figure 48:
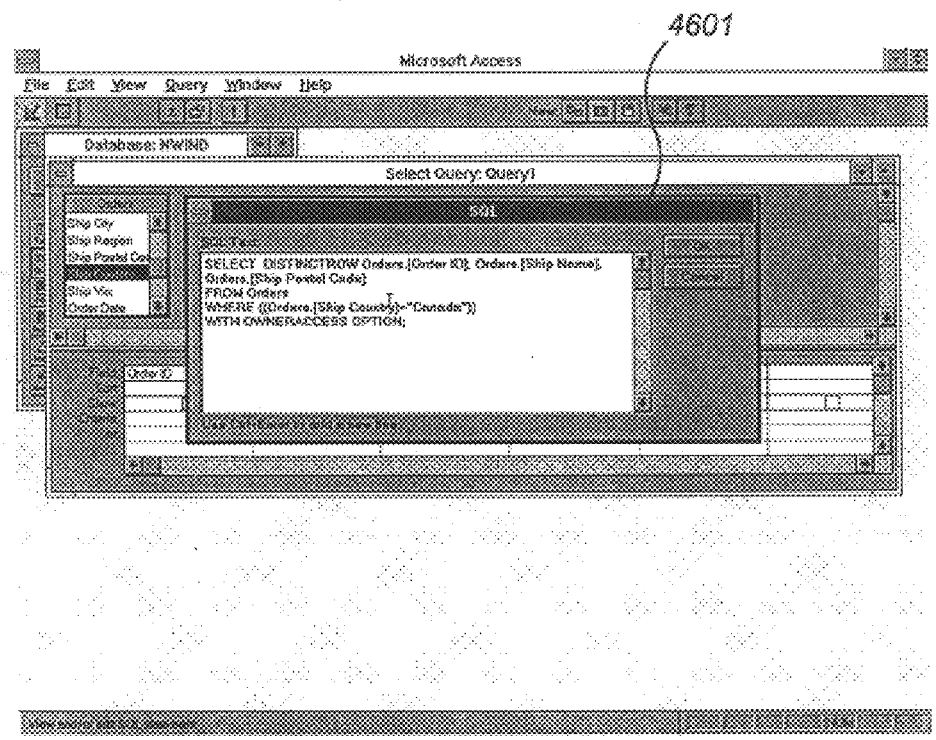
Figure 49:
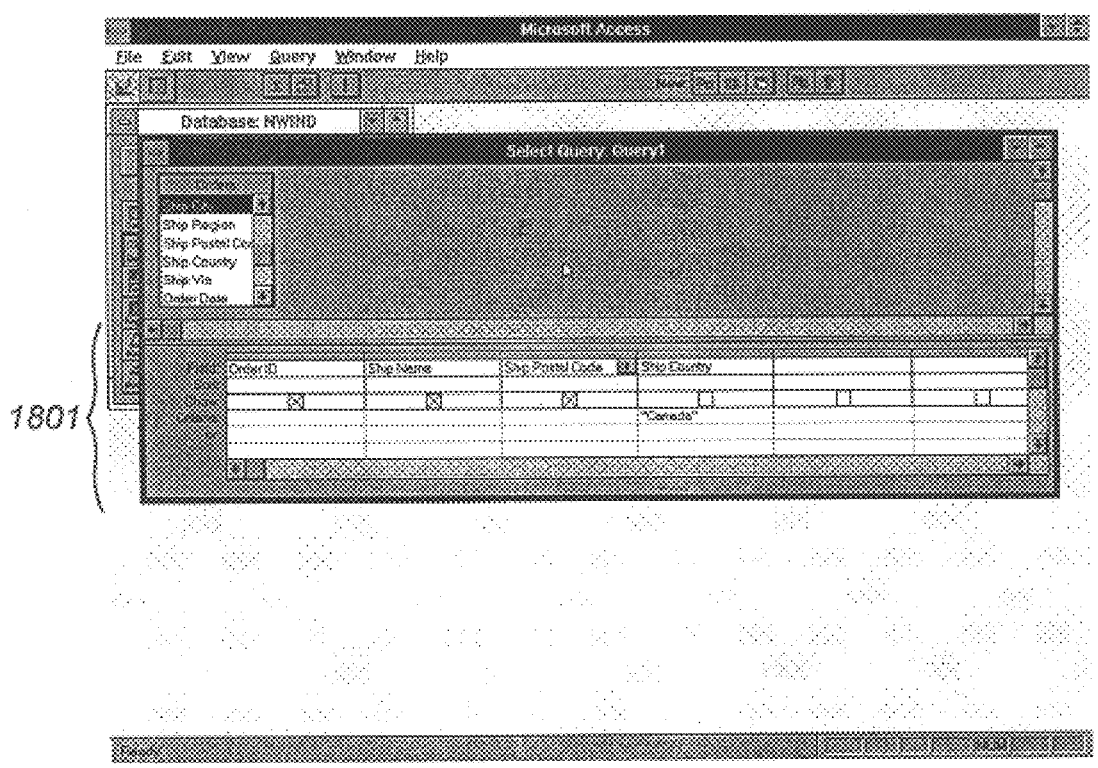

FIG. 45 illustrates a selection of an SQL option 4501 from a pull down view menu 4503. In response to the selection of the SQL option 4501, an SQL dialogue box 4601 (FIG. 46) is displayed on the query window 1503. The SQL statements in the SQL dialogue box 4601 textually represent the query graphically represented in the QBE grid 1801 in FIG. 44. FIG. 47 illustrates selection of a portion of the SQL statement entitled "ship country." FIG. 48 illustrates the modification of the selected portion of the SQL statement to the value "ship postal code." FIG. 49 illustrates how the QBE grid 1801 has been modified to incorporate the changes made to the SQL statement illustrated in the SQL dialogue box 4601 (see for example FIG. 48).

In step 1407, the method view SQL query displays an SQL dialogue box. In step 1409, the method view SQL query receives an input of SQL statements. In step 1411, the method view SQL query displays the received SQL statements in the SQL dialogue box. In step 1413, the method view SQL query constructs a QBE grid which graphically represents the query that is textually represented by the SQL statements. In step 1415, the method view SQL query returns processing control to the method process user requests (FIG. 4A).

It will be appreciated that, although a specific embodiment of the invention has been described herein for purposes of illustration, various modifications may be made without departing from the spirit and scope of the invention. Accordingly, the invention is not limited except as by the appended claims.

We claim:

1. A method in a computer system for visually indicating joining a first table with a second table, each table having a plurality of fields, each field having a field name, the computer system having a display device, the method comprising:

displaying on the display device the field names of the fields of the first table;

displaying on the display device the field names of the fields of the second table;

receiving from a user a selection of a displayed field name of the first table and of a displayed field name of the second table, the selection indicating that the first table and the second table are to be joined by the fields with the selected field names; and displaying on the display device a join indicator between the selected field names to indicate that the tables are to be joined by the fields of the selected field names wherein the displaying of the field names displays the field names in a scrollable list box.

2. The method of claim 1 wherein when the displayed field names are scrolled, the join indicator is also scrolled.

3. The method of claim 2 wherein when the selected field name is scrolled so that it is no longer visible, the join indicator is positioned at one end of the scrollable list box.

4. The method of claim 3 wherein the join indicator is a line.

5. The method of claim 3, including receiving a selection of the join indicator and, in response, displaying information relevant to the join.

6. A method in a computer system for visually representing a join between a first table and a second table, each table having a plurality of fields, each field having a field name, the first table being joined to the second table by a first join field of the first table and a second join field of the second table, the computer system having a display device, the method comprising:

displaying the field names of the first table in a scrollable list box;

displaying the field names of the second table in a list box;

displaying a join indicator between the displayed first join field name of the first table and the displayed second join field name of the second table; and when scrolling the displayed list box of the first table, adjusting the displayed join indicator in accordance with the scrolling of the displayed first join field name of the first table.

7. The method of claim 6 wherein the list box of the first table has ends and where the adjusting of the displayed join indicator includes when the displayed first join field name scrolls off an end of the list box, positioning the displayed join indicator to indicate the end of the list box that the join field name scrolled off.

8. The method of claim 6 wherein the join has characteristics and including in response to selecting the displayed join indicator, displaying the characteristics of the join.

9. The method of claim 8 wherein the displaying of the characteristics includes displaying a property of the join.

10. The method of claim 8, including the modifying by a user of one of the displayed characteristics of the join.

11. The method of claim 6 wherein the join indicator is a line.

12. A computer system for visually representing a join between a first table and a second table, each table having a plurality of fields, each field having a field name, the first table being joined to the second table by a first join field of the first table and a second join field of the second table, the computer system comprising:

a display device;

means for displaying the field names of the first table in a scrollable list box on the display device;

means for displaying the field names of the second table in a scrollable list box on the display device;

means for displaying a join indicator on the display device between the first join field name of the first table and the second join field name of the second table;

means for scrolling a displayed list box; and means for adjusting the displayed join indicator in accordance with the scrolling of the join field name corresponding to the table for the list box being scrolled.

13. A system-readable medium containing instructions for causing a computer system to visually indicate joining a first table with a second table, each table having a plurality of fields, each field having a field name, by:

displaying the field names of the fields of the first table;

displaying the field names of the fields of the second table;

receiving from a user a selection of a displayed field name of the first table and of a displayed field name of the second table, the selection indicating that the first table and the second table are to be joined by the field of the selected field names; and p1 displaying a line between the selected field names to indicate that the tables are to be joined by the fields of the selected field names wherein the displaying of the field names displays the field names in a scrollable list box.

14. The computer-readable medium of claim 13 wherein when the displayed field names are scrolled, the join indicator is also scrolled.

15. The computer-readable medium of claim 14 wherein when the selected field name is scrolled so that it is no longer visible, the join indicator is positioned at one end of the scrollable list box.

16. The computer-readable medium of claim 13, including receiving a selection of the join indicator and, in response, displaying information relevant to the join.

17. A computer-readable medium containing instructions for causing a computer system to visually represent a join between a first table and a second table, each table having a plurality of fields, each field having a field name, the first table being joined to the second table by a first join field of the first table and a second join field of the second table, the computer system having a display device, by:

displaying the field names of the first table in a scrollable list box;

displaying the field names of the second table in a list box;

displaying a join indicator between the displayed first join field name of the first table and the displayed second join field name of the second table; and when scrolling the displayed list box of the first table, adjusting the displayed join indicator in accordance with the scrolling of the displayed first join field name of the first table.

18. The computer-readable medium of claim 17 wherein the list box of the first table has ends and wherein the adjusting of the displayed join indicator includes when the displayed first join field name scrolls off an end of the list box, positioning the displayed join indicator to indicate the end of the list box that the join field name scrolled off.

19. The computer-readable medium of claim 17 wherein the join has characteristics and including in response to selecting the displayed join indicator, displaying the characteristics of the join.

20. The computer-readable medium of claim 17 wherein the displaying of the characteristics includes displaying a property of the join.

21. The computer-readable medium of claim 17, including the modifying by a user of one of the displayed characteristics of the join.

22. The computer-readable medium of claim 17 wherein the join indicator is a line.

* * * * *